US 11,720,930 B2

(12) United States Patent
Newnham et al.

(10) Patent No.: US 11,720,930 B2
(45) Date of Patent: Aug. 8, 2023

(54) AUTOMATED HYBRID, OPTIMIZED ADVERTISING AUCTION SYSTEM AND METHOD

(71) Applicant: LoopMe Limited, London (GB)

(72) Inventors: Leonard Newnham, Buckingham (GB); Piyush Paliwal, Potsdam (DE); Lampros Stavrogiannis, London (GB)

(73) Assignee: Loop Me, Ltd., London (GB)

( * ) Notice: Subject to any disclaimer, the term of this patent is extended or adjusted under 35 U.S.C. 154(b) by 0 days.

(21) Appl. No.: 17/752,601

(22) Filed: May 24, 2022

(65) Prior Publication Data
US 2022/0374944 A1 Nov. 24, 2022

Related U.S. Application Data

(60) Provisional application No. 63/192,185, filed on May 24, 2021.

(51) Int. Cl.
*G06Q 30/0273* (2023.01)
*G06Q 30/0241* (2023.01)

(52) U.S. Cl.
CPC ..... *G06Q 30/0275* (2013.01); *G06Q 30/0277* (2013.01)

(58) Field of Classification Search
CPC .............. G06Q 30/0275; G06Q 30/0277
USPC ...................................... 705/14.71
See application file for complete search history.

(56) References Cited

U.S. PATENT DOCUMENTS

2013/0097028 A1* 4/2013 Han ............... G06Q 30/02
705/14.71
2017/0364945 A1* 12/2017 Juhasz ........... G06Q 30/0246

OTHER PUBLICATIONS

Gligorijevic, Bid Shading in the Brave New World of First-Price Auctions, Oct. 19-23, 2020, CIKM'20 (Year: 2020).*
Sluis, Everything You Need to Know About Bid Shading, Internet Archive Way Back Machine Capture date of Oct. 3, 2019 from URL https://www.adexchanger.com/online-advertising/everything-you-need-to-know-about-bid-shading/, Oct. 3, 2019 (Year: 2019).*
Bid Shading—Who Offers it and How it Impacts Publishers, Internet Archive Way Back Machine Capture date of Dec. 4, 2020 from URL https://headerbidding.co/bid-shading/ (Year: 2020).*

(Continued)

*Primary Examiner* — Tarek Elchanti
(74) *Attorney, Agent, or Firm* — J. Steven Svoboda

(57) ABSTRACT

A hybrid, optimized exchange is provided, the hybrid, optimized exchange operably connected to a demand-side platform (DSP), the hybrid, optimized exchange further operably connected to a supply-side platform (SSP), the hybrid, optimized exchange configured to receive an advertising request, the hybrid, optimized exchange further configured to conduct, using a bid floor, a hybrid, optimized DSP auction of the advertising request among a plurality of DSPs, thereby generating a winning DSP that makes a winning DSP bid in an automated advertising auction system after the SSP initiates an SSP auction of the advertising request, the hybrid, optimized exchange optimizing the bid floor provided to the plurality of DSPs in the hybrid, optimized DSP auction and simultaneously optimizing a shading factor used by the hybrid, optimized exchange to place a hybrid, optimized bid on behalf of the winning DSP in the SSP auction.

33 Claims, 7 Drawing Sheets

(56) References Cited

OTHER PUBLICATIONS

Jatain, What is Bid Shading and How Does it Impact Publishers, Internet Archive Way Back Machine Capture date of Nov. 1, 2019 from URL https://www.adpushup.com/blog/what-is-bid-shading-and-how-does-it-impact-publishers/ (Year: 2019).*

Inventale, Something's Missing from Your gain: Why publishers need floor price optimisation, Internet Archive WayBack Machine Capture date of Jan. 20, 2021 from URL https://inventale.com/en/blog/floor-price-optimization/ (Year: 2021).*

Rosen, A Beginners Guide to First-Price vs. Second-Price Auctions, Internet Archive WayBack Machine Capture date of Sep. 27, 2020 from URL https://www.geoedge.com/first-price-vs-second-price-auctions-publishers/ (Year: 2020).*

3 Tips for Price Floor Optimization in Programmatic, Internet Archive Way Back Machine Capture date of May 7, 2021 from URL https://setupad.com/blog/price-floor-optimization/ (Year: 2021).*

Sold, for more than you should have paid! Internet Archive Way Back Machine Capture date of Apr. 30, 2019 from URL https://www.hearts-science.com/sold-for-more-than-you-should-have-paid/ (Year: 2019).*

Gligorijevic, Bid shading in brave new world of first-price auction, 2020 (Year: 2020).*

Miguel Angel Alcobendas Lisbona, Sheide Chammas, and Kuang-chih Lee. 2016. Optimal Reserve Prices in Upstream Auctions: Empirical Application on Online 673 Video Advertising. In Proceedings of the 22nd ACM SIGKDD International Conference 674 on Knowledge Discovery and Data Mining (San Francisco, California, USA) (KDD 675 '16). Association for Computing Machinery, New York, NY, USA, 1395-1404. https: //doi.org/10.1145/2939672.2939877.

Santiago R. Balseiro, Ozan Candogan, and Huseyin Gurkan 2019 Intermediation 677 in Online Advertising. Springer International Publishing, Cham, 505-528. https: //doi.org/10.1007/978- 3- 030- 01863- 4_21.

Jon Feldman, Vahab Mirrokni, S. Muthukrishnan, and Mallesh M. Pai 2010. Auctions with Intermediaries: Extended Abstract. In Proceedings of the 11th ACM 681 Conference on Electronic Commerce (Cambridge, Massachusetts, USA) (EC '10). 682 Association for Computing Machinery, New York, NY, USA, 23-32. https: //doi.org/10.1145/1807342.1807346.

Djordje Gligorijevic, Tian Zhou, Bharatbhushan Shetty, Brendan Kitts, Shengjun 684 Pan, Junwei Pan, and Aaron Flores 2020. Bid Shading in The Brave New World 685 of First-Price Auctions, In Proceedings of the 29th ACM International Conference 686 on Information & Knowledge Management (Virtual Event, Ireland) (CIKM '20). Association for Computing Machinery. New York, NY, USA, 2453-2460. https: 687 //doi.org/10.1145/3340531.3412689.

Gregoire Jauvion, Nicolas Grislain, Pascal Dkengne Sielenou, Aurélien Garivier, and Sébastien Gerchinovitz. 2018. Optimization of a SSP's Header Bidding Strategy 689 Using Thompson Sampling. In Proceedings of the 24th ACM SIGKDD International 690 Conference on Knowledge Discovery and Data Mining (London, United Kingdom) 691 (KDD '18). Association for Computing Machinery, New York, NY, USA, 425-432. https://doi.org/10.1145/3219819.3219917.

Vijay Krishna, 2010. Auction Theory, Academic Press.

Lampros C. Stavrogiannis. 2014. Competition between demand-side intermediaries inadexchanges.Ph.D. Dissertation. UniversityofSouthampton. https://eprints. solon.ac.uk/372683/.

R.C. Elandt-Johnson and N.L. Johnson. 1999. Survival Models and Data Analysis. John Wiley and Sons. Chapters 6, pp. 150-180.

* cited by examiner

FIG. 2 CONTINUED

264 — RETRIEVING, IF THE ADVERTISING REQUEST WAS ASSIGNED TO THE EXPLORATION GROUP, THE OPTIMIZED VALUES FOR THE BID PARAMETERS FOR THE CURRENT ADVERTISING REQUEST BY SENDING A BID PARAMETER QUERY.

266 — RECEIVING, IF THE ADVERTISING REQUEST WAS ASSIGNED TO THE EXPLORATION GROUP, THE REQUESTED OPTIMIZED VALUES FOR THE BID PARAMETERS.

267 — DOING ONE OR MORE OF APPLYING TO THE ADVERTISING REQUEST A RANGE OF CANDIDATE EXPLORATION GROUP BID FLOORS, THE BID FLOOR RANGE CENTERED ON THE OPTIMIZED BID FLOOR, TO EXPLORE AN OUTCOME OF DIFFERENT CANDIDATE EXPLORATION GROUP BID FLOORS WITHIN THE BID FLOOR RANGE AND THEREBY TO IDENTIFY THE OPTIMIZED BID FLOOR, AND APPLYING TO THE ADVERTISING REQUEST A RANGE OF CANDIDATE EXPLORATION GROUP SHADING FACTORS, THE SHADING FACTOR RANGE CENTERED ON THE OPTIMIZED SHADING FACTOR, TO EXPLORE AN OUTCOME OF DIFFERENT CANDIDATE EXPLORATION GROUP SHADING FACTORS WITHIN THE SHADING FACTOR RANGE AND THEREBY TO IDENTIFY THE OPTIMIZED SHADING FACTOR.

268 — STORING, IF THE ADVERTISING REQUEST WAS ASSIGNED TO THE EXPLORATION GROUP, TRAINING DATA, THE TRAINING DATA COMPRISING ONE OR MORE OF THE OUTCOME OF THE EXPLORATION GROUP ADVERTISING REQUEST, THE EXPLORATION GROUP BID FLOOR AND THE EXPLORATION GROUP SHADING FACTOR.

269 — STORING ONE OR MORE, IF THE ADVERTISING REQUEST WAS ASSIGNED TO THE EXPLORATION GROUP, OF THE EXPLORATION GROUP ADVERTISING REQUEST, THE EXPLORATION GROUP BID FLOOR AND THE EXPLORATION GROUP SHADING FACTOR.

270 — USING THE BID FLOOR, CONDUCTING THE HYBRID, OPTIMIZED DSP AUCTION.

271 — DETERMINING A WINNING DSP BID BY A WINNING DSP IN THE HYBRID, OPTIMIZED DSP AUCTION.

272 — STORING ONE OR MORE OF THE WINNING DSP BID AND THE WINNING DSP.

273 — PLACING, USING THE SHADING FACTOR FOR THE ADVERTISING REQUEST, AN SSP BID FOR AN SSP BID AMOUNT ON BEHALF OF THE WINNING DSP IN THE SSP AUCTION.

274 — RECEIVING AN SSP AUCTION RESULT FROM THE SSP.

275 — STORING THE SSP AUCTION RESULT.

FIG. 2 CONTINUED

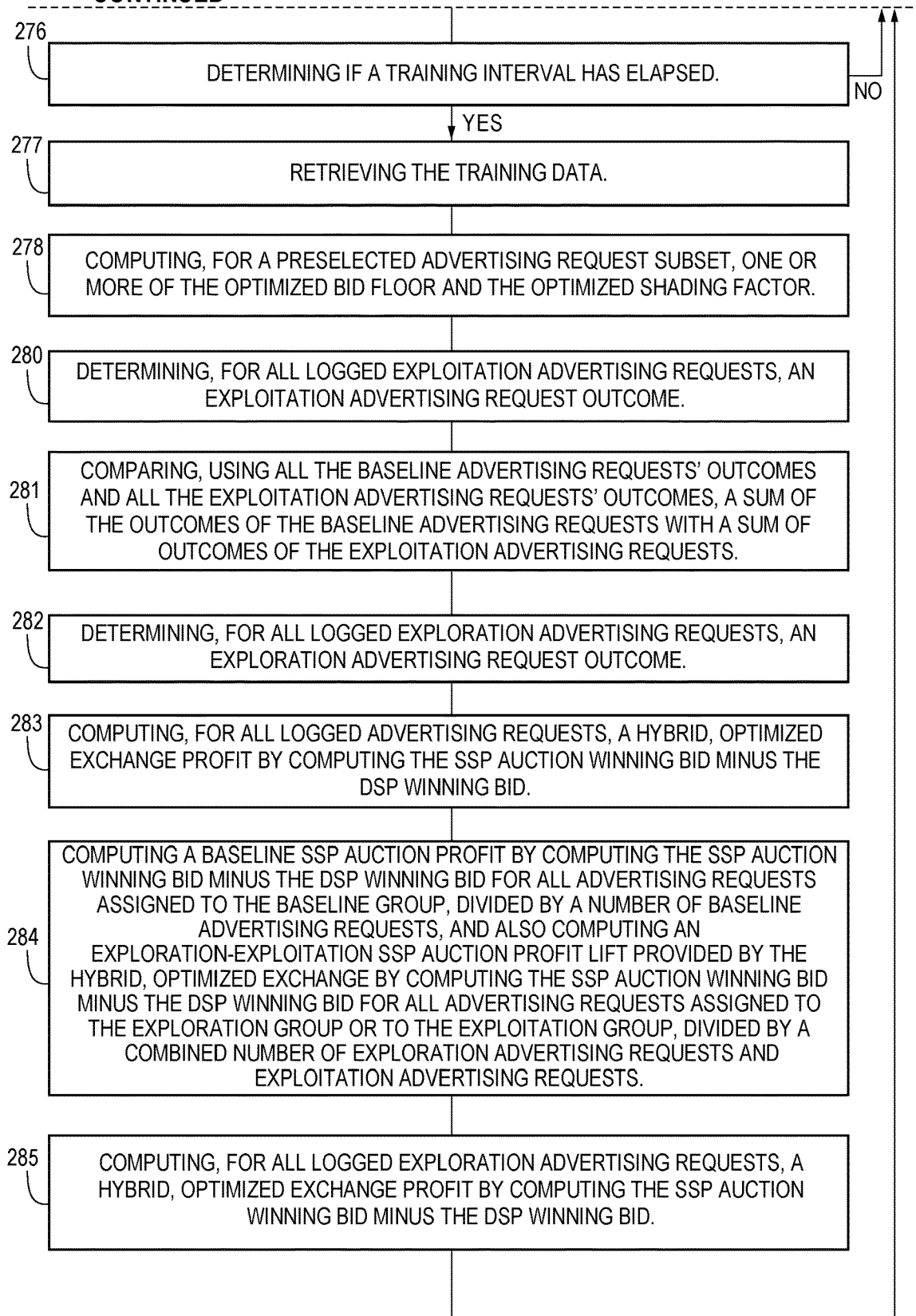

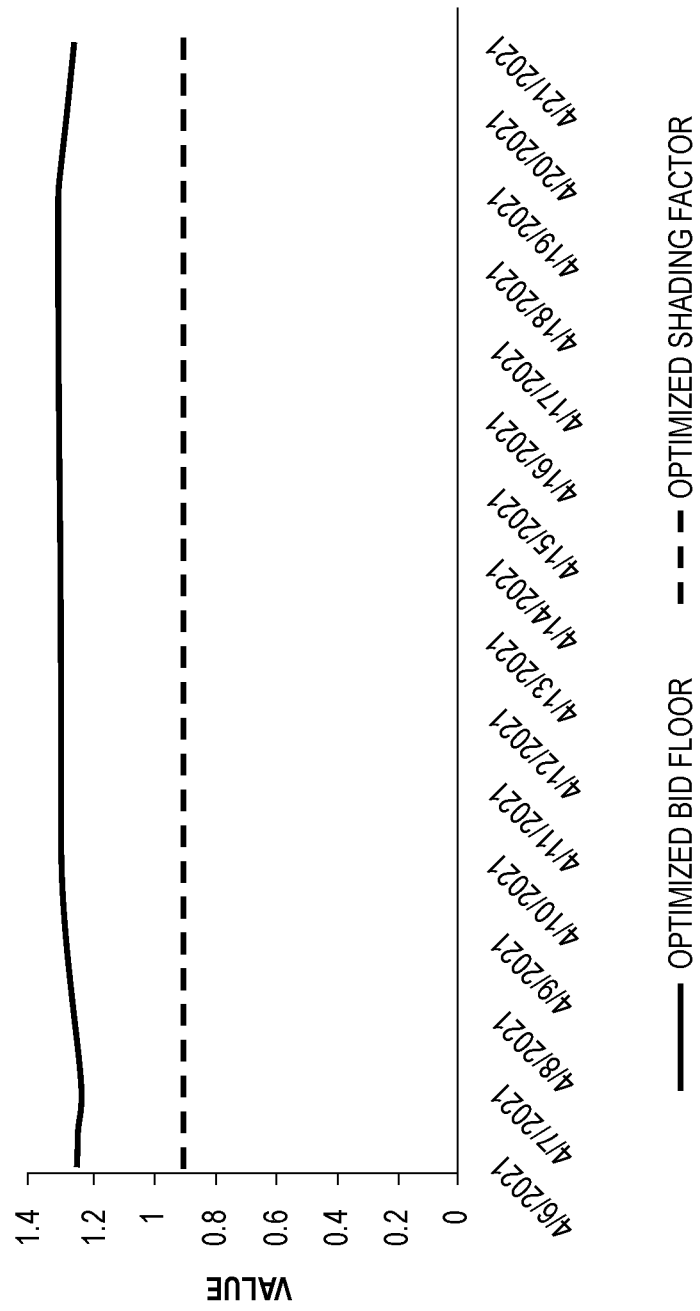

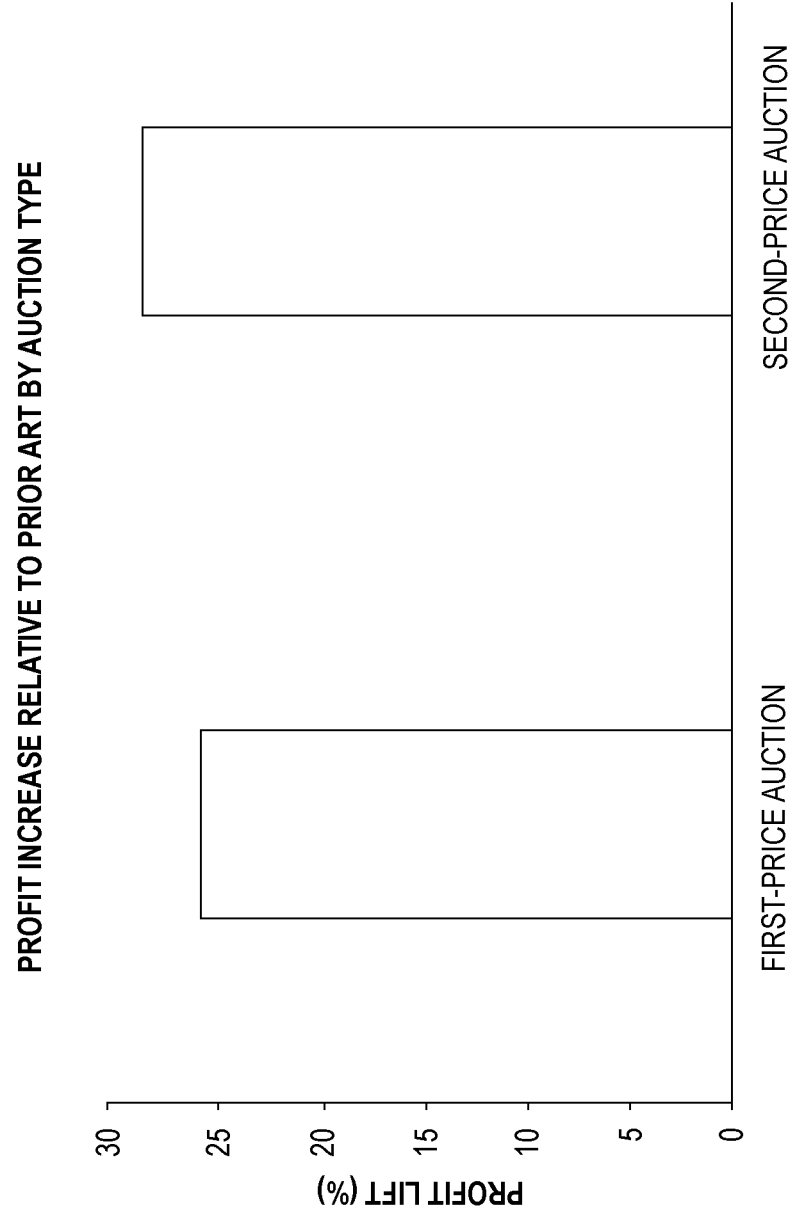

AUTOMATED HYBRID, OPTIMIZED ADVERTISING AUCTION SYSTEM AND METHOD

PRIORITY CLAIM

The present application claims the priority benefit of U.S. provisional patent application No. 63/192,185 filed May 24, 2021 and entitled "Automated Advertising Auction System," the disclosure of which is incorporated herein by reference.

SUMMARY

Embodiments of this invention provide an automated advertising auction system and method. Further embodiments of the invention provide an automated advertising auction system and method for simultaneously optimizing a bid floor provided to a demand-side platform (DSP) in a first auction and a shading factor used to determine a bid price provided to a supply-side platform (SSP) in a second auction. For example, the first auction is an automated auction. For example, the second auction is an automated auction.

A hybrid, optimized exchange is operably connected to a demand-side platform (DSP), the hybrid, optimized exchange further operably connected to a supply-side platform (SSP), the hybrid, optimized exchange configured to receive an advertising request, the hybrid, optimized exchange further configured to conduct, using a bid floor, a hybrid, optimized DSP auction of the advertising request among a plurality of DSPs, thereby generating a winning DSP that makes a winning DSP bid in an automated advertising auction system after the SSP initiates an SSP auction of the advertising request, the hybrid, optimized exchange optimizing the bid floor provided to the plurality of DSPs in the hybrid, optimized DSP auction and simultaneously optimizing a shading factor used by the hybrid, optimized exchange to place a hybrid, optimized bid on behalf of the winning DSP in the SSP auction.

A method for, using a hybrid, optimized exchange operably connected to a demand-side platform (DSP), the hybrid, optimized exchange further operably connected to a supply-side platform (SSP), the hybrid, optimized exchange configured to receive an advertising request in an automated advertising auction system, the hybrid, optimized exchange further configured to conduct, using a bid floor, a hybrid, optimized DSP auction of the advertising request among a plurality of DSPs, thereby generating a winning DSP that makes a winning DSP bid after the SSP initiates an SSP auction of the advertising request, the hybrid, optimized exchange optimizing the bid floor provided to the plurality of DSPs in the hybrid, optimized DSP auction and simultaneously optimizing a shading factor used by the hybrid, optimized exchange to place a hybrid, optimized bid on behalf of the winning DSP in the SSP auction, the method including: receiving an advertising request for an online advertising auction; randomly assigning the received advertising request to one of three advertising request groups, 1) a baseline group comprising a default set of baseline advertising requests using one or more of a default bid floor and a default shading factor whose performance the hybrid, optimized exchange can compare to a performance of other advertising requests using one or more of the optimized bid floor and the optimized shading factor, 2) an exploration group comprising exploration advertising requests, the exploration group usable by the hybrid, optimized exchange to gather a useful set of training data regarding the advertising requests, and 3) an exploitation group comprising exploitation advertising requests, the exploitation group usable by the hybrid, optimized exchange to exploit one or more of the optimized bid floor and the optimized shading factor; retrieving one or more of the optimized bid floor and the optimized shading factor via a bid parameter query; doing one or more, if the advertising request was assigned to the exploitation group, of setting an exploitation group bid floor equal to the optimized bid floor and setting an exploitation group shading factor equal to the optimized shading factor; storing one or more of the exploitation group advertising request, the exploitation group bid floor and the exploitation group shading factor; doing one or more, if the advertising request was assigned to the baseline group, of setting a baseline group bid floor equal to the configured default bid floor and setting a baseline group shading factor equal to the configured default shading factor; storing one or more of the baseline group advertising request, the baseline group bid floor and the baseline group shading factor; retrieving the optimized values for the bid parameters for the current advertising request by sending a bid parameter query; doing one or more, if the advertising request was assigned to the exploration group, of determining an exploration group bid floor by exploring a recent exploration advertising request outcome of an exploration group bid floor comprised within a range on both sides of the optimized bid floor, and determining an exploration group shading factor by exploring a recent exploration advertising request outcome of an exploration group shading factor comprised within a range on both sides of the optimized shading factor; storing the training data; storing one or more of the exploration group advertising request, the exploration group bid floor and the exploration group shading factor; using the bid floor, conducting the hybrid, optimized DSP auction; determining a winning DSP bid by a winning DSP in the hybrid, optimized DSP auction; storing one or more of the winning DSP bid and the winning DSP; using the shading factor, placing an SSP bid for an SSP bid amount on behalf of the winning DSP in the SSP auction; receiving an SSP auction result from the SSP; storing the SSP auction result; determining that a training interval has elapsed, wherein the training interval comprises a period of time after a conclusion of which the hybrid, optimized exchange performs a periodic updated calculation of one or more of the optimal bid floor and the optimal shading factor; retrieving the training data; using the training data, for a preselected advertising request subset, determining one or more of the optimized bid floor and the optimized shading factor; determining a baseline advertising request outcome; determining an exploitation advertising request outcome; comparing the outcome of the baseline advertising request with the outcome of the exploitation advertising request; determining an exploration advertising request outcome; computing a baseline SSP auction profit by computing a baseline SSP auction winning bid minus a baseline DSP winning bid for all advertising requests assigned to the baseline group, divided by a number of baseline advertising requests, and also computing a hybrid, optimized SSP auction profit provided by the hybrid, optimized exchange by computing an exploration-exploitation SSP auction winning bid minus an exploration-exploitation DSP winning bid for all advertising requests assigned to the exploration group or to the exploitation group, divided by a combined number of exploration advertising requests and exploitation advertising requests; dividing exploration requests into a plurality of subsets comprising non-overlapping, contiguous ranges of the bid floor, the plurality of subsets further comprising overlapping, contiguous ranges of the shading factor; computing hybrid, optimized profit by computing the SSP auction winning bid minus the DSP winning bid for a best subset; determining the optimized bid floor as a midpoint of a range of bid floors contained in the best subset; determining the optimized shading factor as a midpoint of a range of shading factors contained in the best subset; and storing both the optimized bid floor and the optimized shading factor.

A hybrid, optimized exchange operably connected to a demand-side platform (DSP), the hybrid, optimized exchange further operably connected to a supply-side platform (SSP), the hybrid, optimized exchange configured to receive an advertising request, the hybrid, optimized exchange further configured to conduct, using a bid floor, a hybrid, optimized DSP auction of the advertising request among a plurality of DSPs, thereby generating a winning DSP that makes a winning DSP bid in an automated advertising auction system after the SSP initiates an SSP auction of the advertising request, the hybrid, optimized exchange optimizing the bid floor provided to the plurality of DSPs in the hybrid, optimized DSP auction and simultaneously optimizing a shading factor used by the hybrid, optimized exchange to place a hybrid, optimized bid on behalf of the winning DSP in the SSP auction, wherein the hybrid, optimized exchange is operably connected via a DSP to an advertiser having an advertisement available for purchase, wherein the hybrid, optimized exchange forwards to a DSP an advertising request that the hybrid, optimized exchange determines is likely to be relevant to the DSP, wherein the hybrid, optimized bid maximizes a hybrid, optimized profit that the hybrid, optimized exchange realizes in a winning SSP auction, wherein the hybrid, optimized exchange is further configured simultaneously to optimize a shading factor and a bid floor, wherein the hybrid, optimized bid comprises the winning DSP bid divided by the optimized shading factor, further comprising a learning engine configured to determine one or more of the optimized bid floor and the optimized shading factor, wherein the learning engine determines one or more of the optimized bid floor and the optimized shading factor once every training interval, wherein the training interval comprises a period of time after a conclusion of which the hybrid, optimized exchange, using the learning engine, performs a periodic updated calculation of one or more of the optimal bid floor and the optimal shading factor, wherein after determining the one or more of the optimized bid floor and the optimized shading factor, the learning engine resets a range of exploration around both the optimized bid floor and the optimized shading factor, wherein the hybrid, optimized exchange further comprises an exchange controller, the exchange controller configured, using the bid floor, to conduct the hybrid, optimized DSP auction, wherein the hybrid, optimized exchange is further configured to determine the winning DSP bid and the winning DSP, wherein the exchange controller comprises an exploration controller configured to receive the advertising request, wherein the exploration controller is further configured randomly to assign the received advertising request into one of a plurality of advertising request groups, wherein the exploration controller is further configured randomly to assign the received advertising request into one of three advertising request groups, 1) a baseline group comprising a default set of baseline advertising requests using one or more of a default bid floor and a default shading factor whose performance the exploration controller can compare to a performance of other advertising requests using one or more of the optimized bid floor and the optimized shading factor, 2) an exploration group comprising exploration advertising requests, the exploration group usable by the exploration controller to gather a useful set of training data regarding the advertising requests, and 3) an exploitation group comprising exploitation advertising requests, the exploitation group usable by the exploration controller to exploit one or more of the optimized bid floor and the optimized shading factor, wherein the exchange controller further comprises a bid parameter controller operably connected to the exploration controller, the bid parameter controller configured to determine one or more of an optimized bid floor usable in the hybrid, optimized DSP auction and an optimized shading factor usable in the SSP auction, wherein the bid parameter controller obtains the one or more of the optimized bid floor and the optimized shading factor by making a bid parameter query, wherein the bid parameter query comprises a query for both the optimized bid floor and the optimized shading factor for a given advertising request source, a given advertising request country, and a given SSP auction type, wherein the bid parameter controller receives the advertising request groups from the exploration controller, wherein, using the advertising request groups, the bid parameter controller determines both the optimized bid floor and the optimized shading factor, further comprising a database, the database operably connected to the exchange controller, wherein the learning engine is operably connected to the database, wherein the hybrid, optimized exchange calculates the optimized bid floor and the optimized shading factor for a given subset of advertising requests, summing over all the advertising requests comprised in the subset, using the equation:

$$\alpha^*,\beta^* = \operatorname{argmax}_\beta \Sigma \operatorname{profit}(\nu,\alpha,\beta)/|B_{\alpha,\beta}| \qquad (1),$$

where the summation is taken over all the requests having the given advertising request source, the given advertising request country, and the given SSP auction type, and where:
$\alpha^*,\beta^*$ are the calculated optimized values for bid floor and shading factor, respectively;
$\nu$ is the application identifier,
$\alpha,\beta$ are the values for bid floor and shading factor, respectively, in the training data; and
$|B_{\alpha,\beta}|$ is the size of the subset comprising $\alpha$ and $\beta$.

A method for, using a hybrid, optimized exchange operably connected to a demand-side platform (DSP), the hybrid, optimized exchange further operably connected to a supply-side platform (SSP), the hybrid, optimized exchange configured to receive an advertising request in an automated advertising auction system, the hybrid, optimized exchange further configured to conduct, using a bid floor, a hybrid, optimized DSP auction of the advertising request among a plurality of DSPs, thereby generating a winning DSP that makes a winning DSP bid after the SSP initiates an SSP auction of the advertising request, the hybrid, optimized exchange optimizing the bid floor provided to the plurality of DSPs in the hybrid, optimized DSP auction and simultaneously optimizing a shading factor used by the hybrid, optimized exchange to place a hybrid, optimized bid on behalf of the winning DSP in the SSP auction, the method including: receiving an advertising request for an online advertising auction; randomly assigning the received advertising request to one of three advertising request groups, 1) a baseline group comprising a default set of baseline advertising requests using one or more of a default bid floor and a default shading factor whose performance the hybrid, optimized exchange can compare to a performance of other advertising requests using one or more of the optimized bid floor and the optimized shading factor, 2) an exploration group comprising exploration advertising requests, the exploration group usable by the hybrid, optimized exchange to gather a useful set of training data regarding the advertising requests, and 3) an exploitation group comprising exploitation advertising requests, the exploitation group usable by the hybrid, optimized exchange to exploit one or more of the optimized bid floor and the optimized shading factor; retrieving one or more of the optimized bid floor and the optimized shading factor via a bid parameter query; doing one or more, if the advertising request was assigned to the exploitation group, of setting an exploitation group bid floor equal to the optimized bid floor and setting an exploitation group shading factor equal to the optimized shading factor; storing one or more of the exploitation group advertising request, the exploitation group bid floor and the exploitation group shading factor; doing one or more, if the advertising request was assigned to the baseline group, of setting a baseline group bid floor equal to the configured default bid floor and setting a baseline group shading factor equal to the configured default shading factor; storing one or more of the baseline group advertising request, the baseline group bid floor and the baseline group shading factor; retrieving the optimized values for the bid parameters for the current advertising request by sending a bid parameter query; doing one or more, if the advertising request was assigned to the exploration group, of determining an exploration group bid floor by exploring a recent exploration advertising request outcome of an exploration group bid floor comprised within a range on both sides of the optimized bid floor, and determining an exploration group shading factor by exploring a recent exploration advertising request outcome of an exploration group shading factor comprised within a range on both sides of the optimized shading factor; storing the training data; storing one or more of the exploration group advertising request, the exploration group bid floor and the exploration group shading factor; using the bid floor, conducting the hybrid, optimized DSP auction; determining a winning DSP bid by a winning DSP in the hybrid, optimized DSP auction; storing one or more of the winning DSP bid and the winning DSP; using the shading factor, placing an SSP bid for an SSP bid amount on behalf of the winning DSP in the SSP auction; receiving an SSP auction result from the SSP; storing the SSP auction result; and determining that a training interval has not elapsed, wherein the training interval comprises a period of time after a conclusion of which the hybrid, optimized exchange performs a periodic updated calculation of one or more of the optimal bid floor and the optimal shading factor.

BRIEF DESCRIPTION OF THE FIGURES

The figures depict various embodiments for purposes of illustration only. One skilled in the art will readily recognize from the following discussion that alternative embodiments of the structure and methods illustrated herein may be employed without departing from the principles described herein.

FIGS. 3A-3B are a set of two drawings presenting experimental results obtained in simulations run on real-world data using a hybrid, optimized exchange that, using a hybrid, optimized demand-side platform (DSP) auction in an automated advertising auction system, simultaneously optimizes a bid floor provided to a DSP pursuant to a supply-side platform (SSP) auction operated by the SSP and a shading factor used by the hybrid, optimized exchange to place a hybrid, optimized bid on behalf of the DSP in the SSP auction.

DETAILED DESCRIPTION

Figure 1:
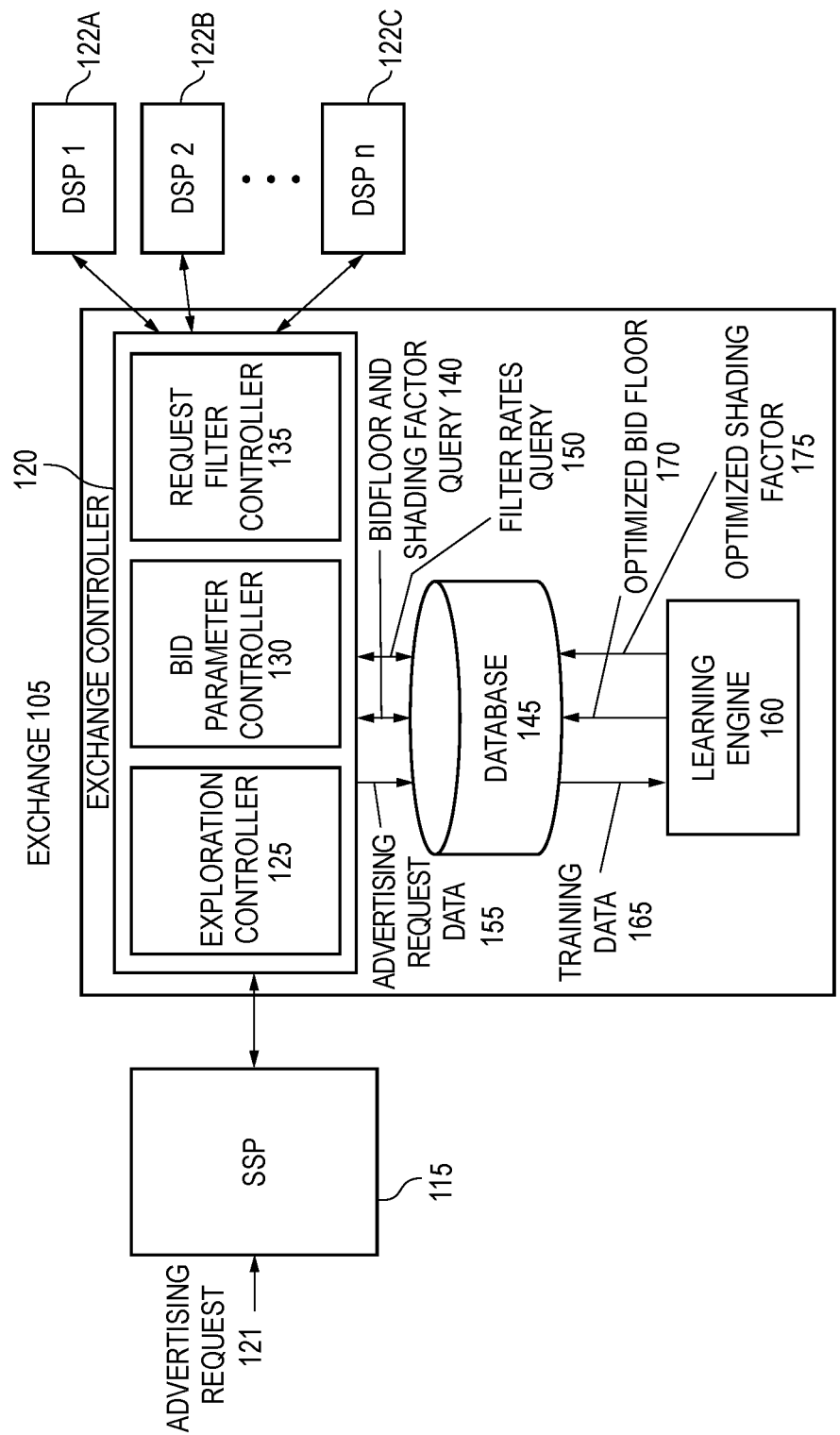
FIG. 1 is a drawing of a hybrid, optimized exchange that conducts a hybrid, optimized demand-side platform (DSP) auction in an automated advertising auction system after a supply-side platform (SSP) has initiated an SSP auction of an advertising request, simultaneously optimizing a bid floor provided to the DSP in the hybrid, optimized DSP auction and optimizing a shading factor to be used by the hybrid, optimized exchange to place a hybrid, optimized bid on behalf of the DSP in the SSP auction.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Embodiments of the invention provide an automated advertising auction system and method. Further embodiments of the invention provide the automated advertising auction system and method using a hybrid, optimized exchange to conduct an internal auction to automatically optimize auction pricing for a server-side platform (SSP) auction conducted by an SSP. The SSP holds the SSP auction, sending an advertising request to a hybrid, optimized exchange.

The hybrid, optimized exchange conducts a hybrid, optimized DSP auction in an automated advertising auction system after the SSP has initiated an SSP auction of an advertising request, simultaneously optimizing a bid floor provided to a demand-side platform (DSP) in the hybrid, optimized DSP auction and optimizing a shading factor to be used by the hybrid, optimized exchange to place a hybrid, optimized bid on behalf of the DSP in a supply-side platform (SSP) auction.

The hybrid, optimized exchange provides a service linking advertisers, the advertisers having advertisements to display, the advertisers being connected to the hybrid, optimized exchange via DSPs, to publishers, the publishers having inventory where advertisements can be displayed and connected via server-side platforms. The hybrid, optimized exchange provides a curated set of advertising requests that are likely to be relevant to the respective DSPs to whom the advertising requests are provided. The hybrid, optimized exchange forwards the advertising requests to the DSPs. The hybrid, optimized exchange only forwards to DSPs the advertising requests that are likely to be relevant to the DSP. The hybrid, optimized exchange is operably connected to a direct advertisement source. Alternatively, or additionally, the hybrid, optimized exchange comprises the direct advertisement source. The advertiser thereby gains access to more relevant publishers than it would be able to access without the invention, thereby making a concrete, real world difference in one or more of advertising effectiveness and advertising costs. The hybrid, optimized exchange thereby provides a tangible, valuable service to advertisers, a service that must be performed in milliseconds, before the end user's page loads, and thus has no possibility of being replicated by a human using pencil and paper. The hybrid, optimized exchange also thereby does one or more of saving money and increasing profit for the operator of the hybrid, optimized exchange. More specifically, the hybrid, optimized exchange maximizes a profit that the hybrid, optimized exchange realizes in a winning SSP auction.

Moreover, the strategy that one bidding DSP takes will be based on expected bids of other DSPs with whom the bidding DSP is competing. That is, the auction participants will be constantly adapting their strategies. The hybrid, optimized exchange, by using its targeted exploration policy, will also adapt its strategy in a data-efficient and automated way that absolutely cannot be provided by a human using pencil and paper, nor was it available in the world prior to the current invention.

Embodiments of the invention provide a hybrid, optimized exchange executable on computer hardware, configured to act as a bidding agent for a downstream supply-side platform (SSP), the hybrid, optimized exchange being further configured to act as a selling auctioneer agent for upstream demand-side platforms (DSPs). The hybrid, optimized exchange is further configured to conduct a hybrid joint censored learning process to optimize one or more of a bid floor and a shading factor. The hybrid, optimized exchange employs a "joint censored" learning mechanism. This refers to simultaneously learning the bid floor and shading factor by taking into account the DSPs' distribution of bids on the hybrid, optimized exchange as well as the winning feedback from the SSP. The joint learning takes place in a dual censored environment as both the DSPs' and SSP's bid distributions are not observed fully. Censoring of data occurs in online auctions as all bid information is not available to all bidders. In the case of a bidder that loses an auction, the bidder only knows that the winning bid price was higher than the bidder's bid but not by how much. In the case of a bidder that wins an auction, the bidder does not know the margin of the bidder's winning bid over the next highest bid. Both these types of censoring make it difficult to adjust a bidding strategy to become more optimal.

The bid floor and the shading factor comprise two parameters that the hybrid, optimized exchange uses in determining a hybrid, optimized bid to place on behalf of the DSP to the SSP. Each of the upstream DSPs can bid in real-time on an advertisement placement being auctioned by the hybrid, optimized exchange. The hybrid, optimized exchange may be a direct source of advertisements or it may be an exchange that in turn, is connected to sources of advertisements. The bid floor comprises a minimum bid that a DSP can make in the hybrid, optimized auction. The shading factor comprises a profit factor between the bid made by the DSP and the bid made on behalf of the DSP by the hybrid, optimized exchange. For example, the shading factor comprises 1.05, in which case a profit, exclusive of overhead, to the hybrid, optimized exchange from placing the bid on behalf of the DSP with the SSP comprises approximately 5 percent.

The hybrid, optimized exchange determines the hybrid, optimized bid that the hybrid, optimized exchange places in the SSP auction by dividing a winning DSP bid in the hybrid, optimized DSP auction by the shading factor. The hybrid, optimized bid maximizes profit that the hybrid, optimized exchange realizes in a winning SSP auction. In order to learn one or more of the bid floor and the shading factor in a dual censored environment, the hybrid, optimized exchange takes into account the DSPs' distribution of bids on the hybrid, optimized exchange as well as feedback from the downstream SSP on winning bids in past auctions.

The SSP auction comprises one or more of a first-price auction and a second-price auction. The hybrid, optimized DSP auction comprises one or more of a first-price auction and a second-price auction. The term "hybrid" refers to the ability of the hybrid, optimized exchange to optimize the bid parameters where the SSP auction comprises a different auction type from the auction type of the hybrid, optimized DSP auction. For example, the SSP auction comprises a first-price auction and the hybrid, optimized DSP auction comprises a second-price auction. For example, the SSP auction comprises a second-price auction and the hybrid, optimized DSP auction comprises a first-price auction. For example, even for a given advertising request, the SSP auction comprises a first-price auction and the hybrid, optimized DSP auction comprises a second-price auction. For example, even for the given advertising request, the SSP auction comprises a second-price auction and the hybrid, optimized DSP auction comprises a first-price auction.

The hybrid, optimized exchange is positioned between the SSP and DSPs, running its own real-time hybrid, optimized auction across registered DSPs. The hybrid, optimized exchange acts as a middleman, passing requests from the SSP to the DSPs connected to the hybrid, optimized exchange. The hybrid, optimized exchange then passes the winner of the hybrid, optimized auction back to the SSP.

A hybrid, optimized exchange partners with one or more of (i) multiple downstream SSPs that are selling advertisement placements on behalf of publishers and (ii) multiple DSPs that are bidding on the advertisement placements on behalf of advertisers. The hybrid, optimized exchange acts as a centralized agent that connects the sellers and buyers to facilitate the transactions. Preferably, but not necessarily, the hybrid, optimized exchange acts as a centralized agent that connects the sellers and buyers to facilitate the transactions in real time. The hybrid, optimized exchange acts as one or more of a bidder for the downstream SSPs and as a seller for its client DSPs. Preferably, but not necessarily, the hybrid, optimized exchange acts as both a bidder for the SSPs and as a seller for its client DSPs.

The hybrid, optimized exchange acts as a bidding agent for the SSPs. Alternatively, or additionally, the hybrid, optimized exchange acts as a selling auctioneer agent for the client DSPs. The hybrid, optimized exchange holds its own centralized first- or second-price sealed-bid auction passing on advertising requests received from the SSPs to the connected DSPs. Preferably, but not necessarily, the hybrid, optimized exchange conducts a hybrid, optimized DSP auction having a same auction type as the SSP auction. However, it has the flexibility to determine the type of auction to run based on what DSPs wish to respond with.

The hybrid, optimized exchange makes a profit in the bidding process in the following way. In its second role, i.e. as a selling auctioneer agent, it extends the downstream SSP's bid floor by a multiplier and, in its first role, i.e. bidding agent, it reduces the bid price of the winning upstream DSP by a shading factor. These margins may then be taken as profit, by the hybrid, optimized exchange. The hybrid, optimized exchange submits the reduced bid amount to the downstream SSP to compete against bids submitted by directly connected client DSPs and other exchanges. Over a plurality of auctions and by adjusting one or more of the extended bid floor and shading factor and by monitoring outcomes of auctions using training data, the hybrid, optimized exchange determines the one or more of the bid floor and the shading factor that maximizes the profit that the hybrid, optimized exchange realizes in a winning SSP auction.

A hybrid, optimized joint censored bidding exchange in an open marketplace is provided. The hybrid, optimized exchange is configured simultaneously to optimize a shading factor and a bid floor. The shading factor comprises a profit margin taken by the hybrid, optimized exchange in submitting a bid on behalf of a demand-side platform (DSP) in an SSP auction operated by the SSP. The hybrid, optimized exchange optimizes the shading factor. For example, the SSP auction comprises one or more of a first-price auction and a second-price auction. The hybrid, optimized bid that the hybrid, optimized exchange places with the SSP on behalf of the DSP comprises the winning bid divided by the optimized shading factor.

Using an automated DSP auction conducted by the hybrid, optimized exchange, the hybrid, optimized exchange simultaneously optimizes a bid floor provided to the DSPs for a hybrid, optimized bid that the hybrid, optimized exchange submits in the SSP auction on behalf of the winning DSP for an advertisement placement. For example, if the hybrid, optimized exchange computes a shading factor of 1.25, and if a DSP receives from the hybrid, optimized exchange a bid floor of $1, then if the winning bids from the DSPs is a bid of $2.5, the hybrid, optimized exchange divides the DSP bid by 1.25, producing a hybrid, optimized bid amount of $2. The hybrid, optimized exchange then places the hybrid, optimized bid on behalf of the DSP with the SSP. All these steps happen in a few tens of milliseconds.

Upon receiving the advertising request, the hybrid, optimized exchange conducts a hybrid, optimized auction. The hybrid, optimized exchange conducts the hybrid, optimized auction across one or more of the DSPs registered with the hybrid, optimized exchange. In the hybrid, optimized auction, the hybrid, optimized exchange sets an optimized bid floor. The optimized bid floor may be different from the bid floor that the hybrid, optimized exchange uses in receiving bids from the DSPs in the hybrid, optimized DSP auction. The hybrid, optimized exchange uses the shading factor to place a hybrid, optimized bid that maximizes profit that the hybrid, optimized exchange realizes in a winning SSP auction.

In particular, embodiments of the invention provide a system and method for maximizing a profit for the hybrid, optimized exchange by setting one or more of an appropriate bid floor for a set of upstream DSPs and a shading factor for a downstream SSP. Embodiments of the invention jointly optimize one or more of the bid floor and the shading factor, taking into account one or more of censoring patterns of upstream auctions and censoring patterns of downstream auctions. Preferably, but not necessarily, the hybrid, optimized exchange optimizes both the bid floor and the shading factor, taking into account both the censoring patterns of the upstream auctions and the censoring patterns of the downstream auctions.

The hybrid, optimized exchange generates optimized values for one or more of the bid floor and the shading factor. Preferably, but not necessarily, the hybrid, optimized exchange generates optimized values for both the bid floor and the shading factor. The hybrid, optimized exchange learns a distribution of bids and uses the distribution information to optimize one or more of the bid floor and the shading factor in an environment in which data is not fully visible, that is, data is censored due to the nature of real-time auctions.

For example, an application running on a mobile device may contain a reserved area for an advertisement. Similarly, a webpage running in a browser may contain a reserved area for an advertisement. Throughout this patent application, for convenience, we primarily reference an application, which can comprise one or more of a mobile device application and a webpage on a website. Typically, to fill this advertisement placement, the application sends a request in real-time to an SSP. The SSP will then run an auction offering the advertisement placement in the auction to many providers of advertisements. The advertisement provider comprises one or more of a DSP and an exchange. The advertisement provider bids for advertisement placement to the SSP. The winning bidder will get their advertisement displayed on the application initiating the request. All this happens within approximately twenty milliseconds.

Embodiments of the invention overcome in an efficient way censoring that auction environments inevitably have, using an exploration mechanism that tries different bid floors and shading factors to collect data that would otherwise be hidden. The hybrid, optimized exchange does this efficiently by, using a learning engine comprised in the hybrid, optimized exchange, only exploring around one or more of an estimated optimized bid floor and an estimated optimized shading factor. Preferably, but not necessarily, the hybrid, optimized exchange, using the learning engine, explores jointly around the optimized bid floor, and the optimized shading factor. For example, and preferably, the hybrid, optimized exchange, using the learning engine, determines one or more of the bid floor and the shading factor once every training interval. The training interval comprises a period of time after a conclusion of which the hybrid, optimized exchange, using the learning engine, performs a periodic updated calculation of one or more of the optimized bid floor and the optimized shading factor. For example, the training interval comprises four hours. After determining one or more of the optimized bid floor and the optimized shading factor, the learning engine resets a range of exploration around one or more of the optimized bid floor and the optimized shading factor. Preferably, but not necessarily, after determining both the optimized bid floor and the optimized shading factor, the learning engine resets a range of exploration around both the optimized bid floor and the optimized shading factor. For example, using this preferred four hour schedule, the learning engine converges within several iterations on an optimized set of values for the one or more of the bid floor and the shading factor for an advertisement auction run by the SSP.

The hybrid, optimized exchange uses the exploration data to determine the optimized values of bid floor and shading factor. This can contain a lot of noise as many ads do not have a statistically large number of impressions. The hybrid, optimized exchange overcomes this by a noise reduction mechanism to give more reliable results using a lower confidence bound (LCB). This novel application of a LCB approach allows embodiments of the invention to find optimized bid floor and shading factors for many lower traffic mobile apps and publishers that would ordinarily not have enough data to enable an automated optimization approach.

The hybrid, optimized exchange logs all the data generated by one or more of the hybrid, optimized DSP auction and the SSP auction. The data comprises one or more of an advertising request source, an advertising request identifier that identifies a specific advertising request, an application identifier of the application that originated the advertising request, an advertising request country where the advertising request originated, a DSP name, a DSP auction type, an SSP auction type, an SSP bid floor, an advertising request timestamp, an advertising request format, a day of the week, a month of the year, a browser type, the optimized bid floor, the hybrid, optimized, shading factor, a clearing price of a winning bid from the DSPs, and an outcome of the hybrid, optimized SSP auction. The outcome comprises one or more of an SSP auction result and hybrid, optimized profit that the hybrid, optimized exchange realizes in the winning SSP auction. Preferably, the outcome comprises both the SSP auction result and the hybrid, optimized profit.

The learning engine uses this data to determine one or more of the optimized bid floor and the optimized shading factor. Preferably, but not necessarily, the learning engine uses this data to determine both the optimized bid floor and the optimized shading factor. The learning engine comprises an estimator configured jointly to determine one or more of a bid floor and a shading factor so as to optimize, for a preselected advertising request subset, profit per advertising request that the hybrid, optimized exchange wins in a winning SSP auction. The preselected advertising request subset can be grouped according to any desired variable. For example, the preselected advertising request is grouped according to one or more of an advertising request source, an advertising request identifier that identifies a specific advertising request, an application identifier of the application that originated the advertising request, an advertising request country where the advertising request originated, a DSP name, a DSP auction type, an SSP auction type, an SSP bid floor, an advertising request timestamp, an advertising request format, a day of the week, a month of the year, a browser type, the optimized bid floor, the hybrid, optimized, shading factor, a clearing price of a winning bid from the DSPs, an outcome of the hybrid, optimized SSP auction, and another variable.

FIG. 1 is a drawing of a hybrid, optimized exchange 105 for use in an automated advertising auction system for, using a hybrid, optimized demand-side platform (DSP) auction, simultaneously optimizing a bid floor provided to a supply-side platform (SSP) pursuant to an SSP auction operated by the SSP and a shading factor used by the hybrid, optimized exchange to place a hybrid, optimized bid on behalf of the DSP in the SSP auction.

The hybrid, optimized exchange 105 is operably connected with the SSP 115. The hybrid, optimized exchange 105 comprises an exchange controller 120. The exchange controller 120 is configured, using the bid floor, to receive an advertising request 121 from the SSP 115. The exchange controller 120 is further configured to conduct the hybrid, optimized DSP auction among competing DSPs 122A-122C. The exchange controller 120 is further configured to determine a winning DSP bid by a winning DSP 122A-122C in the hybrid, optimized DSP auction. The exchange controller 120 is further configured to determine the winning DSP 122A-122C. The exchange controller 120 is further configured to store one or more of the winning DSP bid and the winning DSP 122A-122C. Preferably, but not necessarily, the exchange controller 120 stores both the winning DSP bid and the winning DSP 122A-122C. Most preferably, but not necessarily, the exchange controller 120 stores both the winning DSP bid and the winning DSP 122A-122C in a database.

The exchange controller 120 comprises an exploration controller 125, a bid parameter controller 130 operably connected to the exploration controller 125, and a request filter controller 135 operably connected to the bid parameter controller 130. The exploration controller 125 is configured to receive an advertising request 121. The exploration controller 125 is further configured randomly to assign the advertising request 121 received by the exploration controller 125 into one of three advertising request groups, 1) an exploration group comprising exploration advertising requests, the exploration group usable by the exploration controller 125 to gather a useful set of training data regarding the advertising requests; 2) an exploitation group comprising exploitation advertising requests, the exploitation group usable by the exploration controller 125 to exploit one or more of the optimized bid floor and the optimized shading factor; and 3) a baseline group comprising a default set of baseline advertising requests using one or more of a default bid floor and a default shading factor whose performance the exchange controller compares to a performance using one or more of an optimized bid floor and an optimized shading factor of the exploration advertising requests and the exploitation advertising requests. Preferably, but not necessarily, the exploration controller 125 assigns a majority of the advertising requests to the exploitation group. More preferably, but not necessarily, the exploration controller assigns approximately 10% of the advertising requests to the baseline group, the exploration controller assigns approximately 10% of the advertising requests to the exploration group, and the exploration controller assigns approximately 80% of the advertising requests to the exploitation group.

The bid parameter controller 130 is configured to determine one or more of the optimized bid floor and the optimized shading factor. The request filter controller 135 is configured to determine whether to reject the advertising request 121 or, alternatively, whether to pass the advertising request 121 on to one or more DSPs 122A-122C.

Using one or more of a default bid floor and a default shading factor, the hybrid, optimized exchange 105 creates the baseline group comprising a set of advertising requests. The hybrid, optimized exchange uses the baseline group to implement a baseline strategy to which the hybrid, optimized exchange compares its attempts to optimize one or more of the bid floor and the shading factor using the exploration group and the exploitation group. Preferably, but not necessarily, using both of the default bid floor and the default shading factor, the hybrid, optimized exchange 105 creates the baseline group. A human operator predetermines one or more of the default bid floor and the default shading factor. Preferably, but not necessarily, the human operator predetermines both the default bid floor and the default shading factor. The performance of the baseline group acts as a baseline against which the exchange controller 120 compares the performance of the exploitation group.

Over a plurality of auctions and by adjusting the bid floor and shading factor and monitoring historical training data for one or more of auction wins and auction losses, the hybrid, optimized exchange 105 learns a combination of the bid floor and the shading factor that maximizes the profit that the hybrid, optimized exchange realizes in a winning SSP auction. The hybrid, optimized exchange 105 uses the exploration group to gather a useful set of training data regarding the advertising requests. The hybrid, optimized exchange uses the exploration group to perform a dual censoring exploration of optimized values of one or more of the bid floor and the shading factor. For example, the exploration controller 125 places a majority of the advertising requests 121 in the exploitation group. Alternatively, or additionally, the exploration controller 125 apportions different percentages of the advertising requests 121 between the baseline, exploration, and exploitation groups. If the exploration controller 125 assigned an advertising request 121 to the exploitation group, the bid parameter controller 130 sets the optimized bid floor and shading factor to each request. The hybrid, optimized exchange uses the exploitation group to optimize one or more of the bid floor and the shading factor using past data from the exploration group. Using the exploitation group, the hybrid, optimized exchange 105 exploits one or more of the bid floor and the shading factor. Preferably, but not necessarily, the exploitation group exploits both the bid floor and the shading factor. To do this, the bid parameter controller retrieves the optimized values for the current request via a bid parameter query 140 to the database 145. The step of retrieving the optimized values comprises retrieving both the optimized bid floor and the optimized shading factor.

The bid parameter controller 130 receives the advertising request 121 from the exploration controller 125. The bid parameter controller 130 further receives from the exploration controller 125 the group to which the exploration controller 125 assigned the advertising request 121. Using the three advertising request groups selected by the exploration controller 125, the bid parameter controller 130 is configured to determine one or more of an optimized bid floor usable in the hybrid, optimized DSP auction and an optimized shading factor usable in the SSP auction. Preferably, but not necessarily, using the three advertising request groups selected by the exploration controller 125, the bid parameter controller 130 is configured to determine optimized values of both the bid floor and the shading factor. The bid parameter controller 130 determines an optimized value of the bid floor usable in the hybrid, optimized DSP auction. The bid parameter controller 130 determines an optimized value of the shading factor usable in the SSP auction.

If the advertising request 121 was assigned by the exploration controller 125 to the baseline group, the hybrid, optimized exchange 105, using the bid parameter controller 130, applies the configured default values of one or more of the bid floor and the shading factor to the baseline group. Preferably, but not necessarily, if the advertising request 121 was assigned by the exploration controller 125 to the baseline group, the hybrid, optimized exchange 105, using the bid parameter controller 130, applies the configured default values of both the bid floor and the shading factor to the baseline group.

If the advertising request 121 was assigned by the exploration controller 125 to the exploration group, the bid parameter controller 130 applies to the advertising request 121 a range of candidate exploration group bid floors, the bid floor range centered on the optimized bid floor, to explore an outcome of different candidate exploration group bid floors within the bid floor range and thereby to identify the optimized bid floor. Similarly, for the advertising request 121 that was assigned by the exploration controller 125 to the exploration group, the bid parameter controller 130 applies to the advertising request 121 a range of candidate exploration group shading factors, the shading factor range centered on the optimized shading factor, to explore an outcome of different candidate exploration group shading factors within the shading factor range and thereby to identify the optimized shading factor. For example, the bid parameter controller 130 comprises a random number generator that the bid parameter controller 130 uses to select one or more of the candidate exploration group bid floors within the bid floor range, and the candidate exploration group shading factors within the shading factor range. The outcome comprises one or more of an SSP auction result and hybrid, optimized profit that the hybrid, optimized exchange realizes in the winning SSP auction. Preferably, the outcome comprises both the SSP auction result and the hybrid, optimized profit. For example, if the optimized bid floor equals five dollars, the bid floor range comprises four dollars to six dollars. This means that the range of possible bid floors comprises four dollars to six dollars.

To do this, the bid parameter controller 130 first retrieves one or more of the optimized bid floor and the optimized shading factor for the current advertising request by sending a bid parameter query 140 to the database 145. Preferably, but not necessarily, the bid parameter controller 130 retrieves both the optimized bid floor and the optimized shading factor for the current advertising request by sending the bid parameter query 140 to the database 145.

The hybrid, optimized exchange 105 further comprises a database 145, the database operably connected to the exchange controller 120.

For at least one advertising request 121, the hybrid, optimized exchange logs advertising request data 155 to the database 145. The advertising request data 155 comprises one or more of request data, the bid floor, the shading factor, the assigned advertising request group, and whether the advertising request 121 resulted in a winning SSP bid and thus in an advertisement placement on the end user's device.

The hybrid, optimized exchange 105 further comprises a learning engine 160, the learning engine 160 operably connected to the database 145. The advertising request data 155 becomes the training data for the learning engine 160. The learning engine 160 periodically processes results of the SSP auctions using advertising requests grouped by a preselected advertising request subset. The preselected advertising request subset can be grouped according to any desired variables. The learning engine 160 determines bid parameters 170 and stores them in the database 145. The learning engine 160 also determines filter rates 175 and stores them in the database 145.

For example, the preselected advertising request subset comprises a given advertising request source, a given advertising request country, and a given SSP auction type. For example, the bid parameter query comprises a query for one or more of the optimized bid floor and the optimized shading factor for a given advertising request source, a given advertising request country, and a given SSP auction type. For example, the bid parameter query comprises a query for one or more of the optimized bid floor and the optimized shading factor for a given advertising request country and a given SSP auction type. The learning engine 160 retrieves the data stored in the database 145. The learning engine 160 then uses the data as training data 165. The learning engine 160 then determines, for an advertising request subset, one or more of an optimized bid floor 170 and an optimized shading factor 175. Preferably, for each advertising request subset, the learning engine 160 determines, for an advertising request subset, one or more of an optimized bid floor 170 and an optimized shading factor 175. The learning engine 160 stores one or more of the optimized bid floor 170 and the optimized shading factor 175 in the database 145. Preferably, but not necessarily, the learning engine 160 stores both the optimized bid floor 170 and the optimized shading factor 175 In the database 145.

For example, the hybrid, optimized exchange calculates the optimized bid floor and the optimized shading factor for a given subset of advertising requests, summing over all the advertising requests comprised in the subset, using the equation:

$$\alpha^*, \beta^* = \operatorname{argmax}_B \Sigma \operatorname{profit}(\nu, \alpha, \beta) / |B_{\alpha, \beta}| \qquad (1)$$

where:
- α*,β* are the calculated optimized values for bid floor and shading factor, respectively;
- v is the application identifier,
- α,β are the values for bid floor and shading factor, respectively, in the training data; and
- $|B_{\alpha,\beta}|$ is the size of the subset comprising α and β.

The learning engine 160 determines one or more of the bid floor and the shading factor once every training interval. The training interval comprises a period of time after a conclusion of which the hybrid, optimized exchange 105, using the learning engine 160, performs an updated calculation of one or more of the optimized bid floor 170 and the optimized shading factor 175. Preferably, but not necessarily, the learning engine 160 periodically, once every training interval, retrieves the latest training data and updates all bid floors and shading factors. For example, the training interval comprises four hours. For example, the training interval comprises one second. For example, the training interval comprises one day. For example, the training interval comprises one month.

Figure 2:
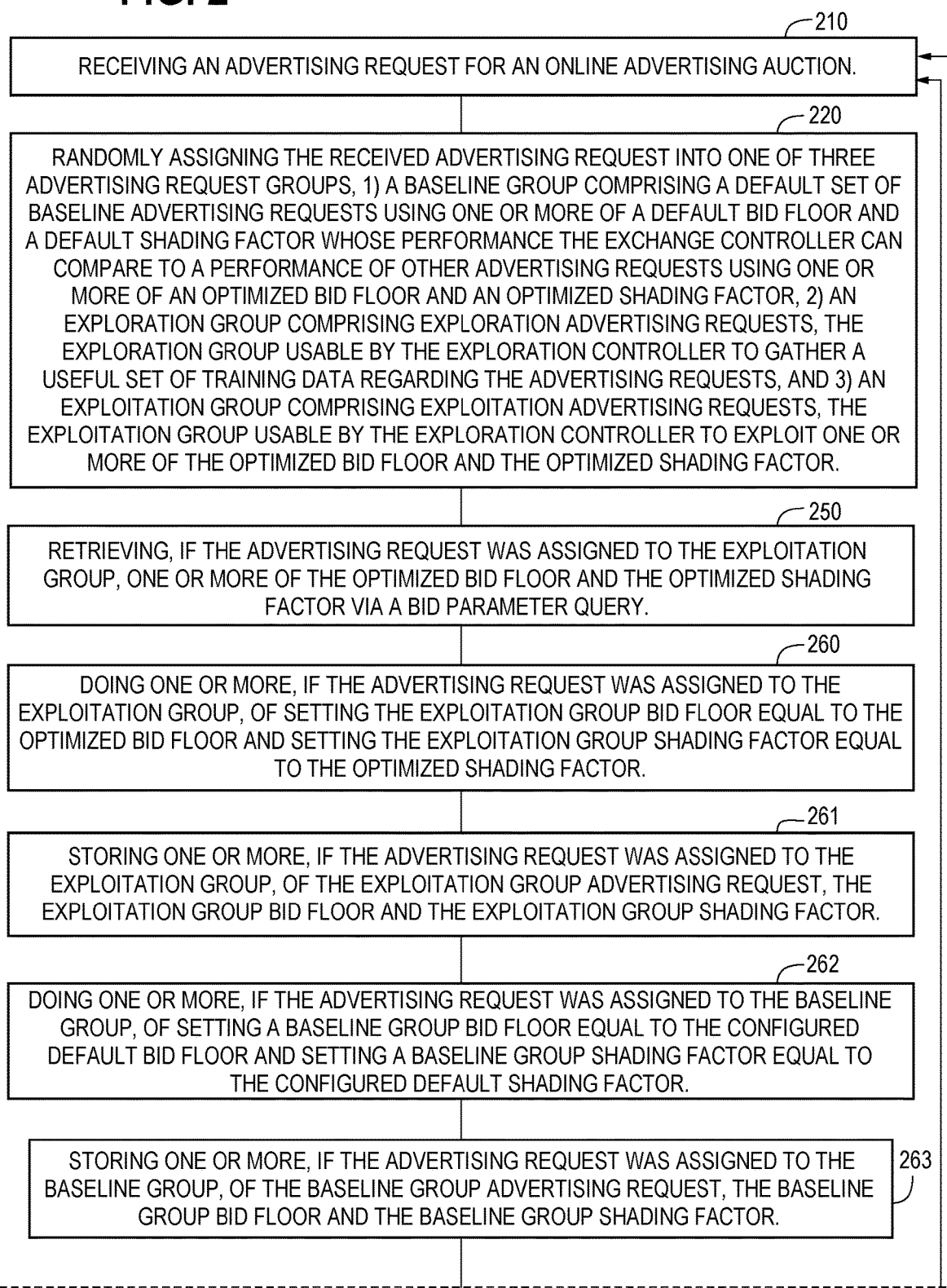
FIG. 2 is a flow chart of a method for, using a hybrid, optimized exchange configured to conduct a hybrid, optimized demand-side platform (DSP) auction in an automated advertising auction system, optimizing a bid floor provided to a supply-side platform (SSP) pursuant to an SSP auction operated by the SSP and simultaneously optimizing a shading factor used by the hybrid, optimized exchange to place a hybrid, optimized bid on behalf of the DSP in the SSP auction.
Figure 2:
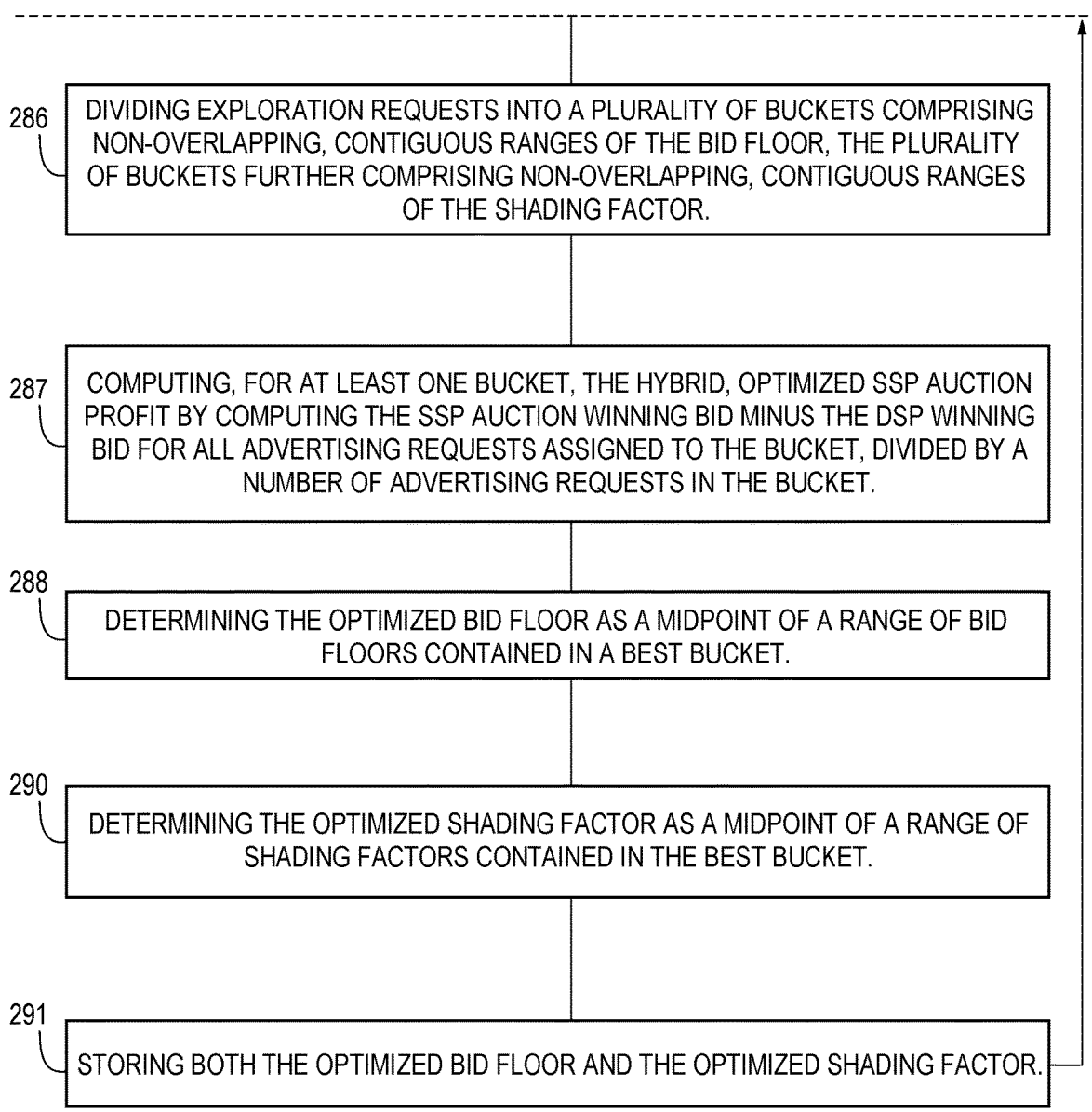

FIG. 2 is a flow chart of a method 200 for, using a hybrid, optimized exchange configured to conduct a hybrid, optimized demand-side platform (DSP) auction in an automated advertising auction system, optimizing a bid floor provided to a supply-side platform (SSP) pursuant to an SSP auction operated by the SSP and simultaneously optimizing a shading factor used by the hybrid, optimized exchange to place a hybrid, optimized bid on behalf of the DSP in the SSP auction.

More specifically, FIG. 2 is a flow chart showing determination, by the hybrid, optimized exchange, of the bid floor and the shading factor.

The order of the steps in the method 200 is not constrained to that shown in FIG. 2 or described in the following discussion. Several of the steps could occur in a different order without affecting the final result.

In step 210, the hybrid, optimized exchange, the hybrid, optimized exchange comprising an exchange controller, the exchange controller comprising an exploration controller and a bid parameter controller operably connected to the exploration controller, the exploration controller being configured randomly to assign advertising requests received by the exploration controller on behalf of a demand-side platform (DSP) in a supply-side platform (SSP) auction, the bid parameter controller being configured to determine one or more of an optimized bid floor usable in the hybrid, optimized DSP auction and an optimized shading factor usable in the SSP auction, using the exchange controller, using the exploration controller, receives an advertising request for an online advertising auction. Block 210 then transfers control to block 220.

In step 220, the hybrid, optimized exchange, using the exploration controller, randomly assigns the received advertising request into one of three advertising request groups, 1) a baseline group comprising a default set of baseline advertising requests using one or more of a default bid floor and a default shading factor whose performance the exchange controller can compare to a performance of other advertising requests using one or more of an optimized bid floor and an optimized shading factor, 2) an exploration group comprising exploration advertising requests, the exploration group usable by the exploration controller to gather a useful set of training data regarding the advertising requests, and 3) an exploitation group comprising exploitation advertising requests, the exploitation group usable by the exploration controller to exploit one or more of the optimized bid floor and the optimized shading factor. Preferably, but not necessarily, the exploration controller assigns a majority of the advertising requests in the exploitation group. For example, the assigning step further comprises assigning approximately 10% of the advertising requests to the baseline group, For example, the assigning step further comprises assigning approximately 10% of the advertising requests to the exploration group. For example, the assigning step further comprises assigning approximately 80% of the advertising requests to the exploitation group. For example, one or more of the default bid floor and the default shading factor are predetermined by a human operator. Block 220 then transfers control to block 250.

In step 250, the hybrid, optimized exchange, using the bid parameter controller, if the advertising request was assigned to the exploitation group, retrieves one or more of the optimized bid floor and the optimized shading factor via a bid parameter query. Preferably, if the advertising request was assigned to the exploitation group, the hybrid, optimized exchange, using the bid parameter controller, retrieves both the optimized bid floor and the optimized shading factor via the bid parameter query. Most preferably, if the advertising request was assigned to the exploitation group, the hybrid, optimized exchange, using the bid parameter controller, retrieves both the optimized bid floor and the optimized shading factor via the bid parameter query from a database.

For example, the bid parameter query comprises a query for one or more of the optimized bid floor and the optimized shading factor for one or more of a given advertising request source, a given advertising request country, and a given SSP auction type. For example, the bid parameter query comprises a query for one or more of the optimized bid floor and the optimized shading factor for a given advertising request source, a given advertising request country, and a given SSP auction type. For example, the bid parameter query comprises a query for both the optimized bid floor and the optimized shading factor for a given advertising request source, a given advertising request country, and a given SSP auction type. Block 250 then transfers control to block 260.

In step 260, the hybrid, optimized exchange, using the bid parameter controller, if the advertising request was assigned to the exploitation group, does one or more of setting the exploitation group bid floor equal to the optimized bid floor and setting the exploitation group shading factor equal to the optimized shading factor. Preferably, but not necessarily, for the advertising request assigned to the exploitation group, the hybrid, optimized exchange, using the bid parameter controller, does both of setting the bid floor equal to the optimized bid floor and setting the shading factor equal to the optimized shading factor. Most preferably, but not necessarily, for all advertising requests assigned to the exploitation group, the hybrid, optimized exchange, using the bid parameter controller, does both of setting the bid floor equal to the optimized bid floor and setting the shading factor equal to the optimized shading factor. Block 260 then transfers control to block 261.

In step 261, the hybrid, optimized exchange, using the bid parameter controller, if the advertising request was assigned to the exploitation group, stores one or more of the exploitation group advertising request, the exploitation group bid floor and the exploitation group shading factor. Preferably, but not necessarily, the hybrid, optimized exchange, using the bid parameter controller, stores one or more of the exploitation group advertising request, the exploitation group bid floor and the exploitation group shading factor in a database. Most preferably, but not necessarily, the hybrid, optimized exchange, using the bid parameter controller, stores the exploitation group advertising request, the exploitation group bid floor and the exploitation group shading factor in the database. Block 261 then transfers control to block 262.

In step 262, the hybrid, optimized exchange, using the bid parameter controller, if the advertising request was assigned to the baseline group, does one or more of setting a baseline group bid floor equal to the configured default bid floor and setting a baseline group shading factor equal to the configured default shading factor. Preferably, but not necessarily, the hybrid, optimized exchange, using the bid parameter controller, for an advertising request assigned to the baseline group, does both of setting the baseline group bid floor equal to the configured default bid floor and setting the baseline group shading factor equal to the configured default shading factor. Block 262 then transfers control to block 263.

In step 263, the hybrid, optimized exchange, using the bid parameter controller, if the advertising request was assigned to the baseline group, stores one or more of the baseline group advertising request, the baseline group bid floor and the baseline group shading factor. Preferably, but not necessarily, the hybrid, optimized exchange, using the exploration controller, stores the baseline group advertising request, the baseline group bid floor and the baseline group shading factor. Most preferably, but not necessarily, the hybrid, optimized exchange, using the exploration controller, stores the baseline group advertising request, the baseline group bid floor and the baseline group shading factor in the database. Block 263 then transfers control to block 264.

In step 264, the hybrid, optimized exchange, using the bid parameter controller, if the advertising request was assigned to the exploration group, retrieves the optimized values for the bid parameters for the current advertising request by sending a bid parameter query. Preferably, but not necessarily, the hybrid, optimized exchange, using the bid parameter controller, sends the bid parameter query to a database. Block 264 transfers control to block 266.

In step 266, the hybrid, optimized exchange, using the bid parameter controller, if the advertising request was assigned to the exploration group, receives the requested optimized values for the bid parameters. For example, the hybrid, optimized exchange, using the bid parameter controller, receives the requested optimized values for the bid parameters from the database. Block 266 transfers control to block 267.

In step 267, the hybrid, optimized exchange, if the advertising request was assigned to the exploration group, using the bid parameter controller, and using the optimized values for the bid parameters, does one or more of applying to the advertising request a range of candidate exploration group bid floors, the bid floor range centered on the optimized bid floor, to explore an outcome of different candidate exploration group bid floors within the bid floor range and thereby to identify the optimized bid floor, and applying to the advertising request a range of candidate exploration group shading factors, the shading factor range centered on the optimized shading factor, to explore an outcome of different candidate exploration group shading factors within the shading factor range and thereby to identify the optimized shading factor. Preferably, but not necessarily, the hybrid optimized exchange, using the bid parameter controller, both 1) determines the exploration group bid floor by applying to the advertising request a range of candidate exploration group bid floors, the bid floor range centered on the optimized bid floor, to explore an outcome of different candidate exploration group bid floors within the bid floor range and thereby to identify the optimized bid floor, and 2) determines the exploration group shading factor by applying to the advertising request a range of candidate exploration group shading factors, the shading factor range centered on the optimized shading factor, to explore an outcome of different candidate exploration group shading factors within the shading factor range and thereby to identify the optimized shading factor.

For example, the hybrid, optimized exchange, using the bid parameter controller, uses a random number generator comprised in the bid parameter controller to select one or more of the candidate exploration group bid floors within the bid floor range and the candidate exploration group shading factors within the shading factor range. For example, the bid parameter controller, using the random number generator, calculates the exploration group bid floor as equal to (a random number between 0.5 and 2.0)*(the exploitation group bid floor). For example, the bid parameter controller, using the random number generator calculates the exploration group shading factor as equal to (a random number between 0.5 and 2.0)*(the exploitation group shading factor). Preferably, but not necessarily, if the advertising request was assigned by the exploration controller to the exploration group, the bid parameter controller does both of determining the exploration group bid floor by adding a random offset within the range on both sides of the optimized bid floor, and determining the exploration group shading factor by adding a random offset within the range of exploration group shading factors on both sides of the optimized shading factor. The outcome comprises one or more of an SSP auction result and hybrid, optimized profit that the hybrid, optimized exchange realizes in the winning SSP auction. Preferably, the outcome comprises both the SSP auction result and the hybrid, optimized profit.

For example, the bid parameter controller calculates the exploration group bid floor as equal to (a random number between 0.5 and 2.0)*(the exploitation group bid floor). For example, the bid parameter controller calculates the exploration group shading factor as equal to (a random number between 0.5 and 2.0)*(the exploitation group shading factor). Block 267 then transfers control to block 268.

In step 268, the hybrid, optimized exchange, using the bid parameter controller, if the advertising request was assigned to the exploration group, stores training data, the training data comprising one or more of the outcome of the exploration group advertising request, the exploration group bid floor and the exploration group shading factor. Preferably, but not necessarily, the hybrid, optimized exchange, using the bid parameter controller, for the advertising request assigned to the exploration group, stores the training data in a database. Block 268 then transfers control to block 269.

In step 269, the hybrid, optimized exchange, using the bid parameter controller, if the advertising request was assigned to the exploration group, stores one or more of the exploration group advertising request, the exploration group bid floor and the exploration group shading factor. Preferably, but not necessarily, the hybrid, optimized exchange, using the bid parameter controller, for the advertising request assigned to the exploration group, stores the one or more of the exploration group advertising request, the exploration group bid floor and the exploration group shading factor in a database. Most preferably, but not necessarily, the hybrid, optimized exchange, using the bid parameter controller, stores the exploration group advertising request, the exploration group bid floor and the exploration group shading factor in the database. Block 269 then transfers control to block 270.

In step 270, the hybrid, optimized exchange, using the exchange controller, using the bid floor, conducts the hybrid, optimized DSP auction. Block 270 then transfers control to block 271.

In step 271, the hybrid, optimized exchange, using the exchange controller, determines a winning DSP bid by a winning DSP in the hybrid, optimized DSP auction. Block 271 then transfers control to block 272.

In step 272, the hybrid, optimized exchange, using the exchange controller, stores one or more of the winning DSP bid and the winning DSP. Preferably, but not necessarily, the hybrid, optimized exchange, using the exchange controller, stores both the winning DSP bid and the winning DSP. Most preferably, but not necessarily, the hybrid, optimized exchange, using the exchange controller, stores both the winning DSP bid and the winning DSP in a database. Block 272 then transfers control to block 273.

In step 273, the hybrid, optimized exchange, using the exchange controller, using the shading factor for the advertising request, places an SSP bid for an SSP bid amount on behalf of the winning DSP in the SSP auction. The SSP bid amount comprises a quotient of the winning DSP bid divided by the shading factor. Block 273 then transfers control to block 274.

In step 274, the hybrid, optimized exchange, using the exchange controller, receives an SSP auction result from the SSP. The SSP auction result comprises one or more of an SSP auction win and an SSP auction loss. Preferably, but not necessarily, the SSP auction result comprises either the SSP auction win or the SSP auction loss. The SSP auction win comprises an SSP auction winning amount. Block 274 then transfers control to block 275.

In step 275, the hybrid, optimized exchange, using the exchange controller, stores the SSP auction result. Preferably, but not necessarily, the hybrid, optimized exchange, using the exchange controller, stores the SSP auction result in a database. Block 275 then transfers control to block 276.

In step 276, the hybrid, optimized exchange determines if a training interval has elapsed. The learning engine determines one or more of the optimized bid floor and the optimized shading factor once every training interval. Preferably, but not necessarily, the learning engine periodically, once every training interval, retrieves the latest training data and updates all bid floors and shading factors. For example, the training interval comprises four hours. For example, the training interval comprises one second. For example, the training interval comprises one day. For example, the training interval comprises one month. If no, the process loops back to step 210. If yes, the process proceeds to step 277.

In step 277, the hybrid, optimized exchange, using the learning engine, retrieves the training data. For example, the learning engine retrieves the training data stored in the database. Block 277 then transfers control to block 278.

In step 278, the hybrid, optimized exchange, using the learning engine, using the training data, for a preselected advertising request subset, computes one or more of the optimized bid floor and the optimized shading factor. Preferably, but not necessarily, the learning engine, using the training data, computes one or more of the optimized bid floor and the optimized shading factor for all the preselected advertising request subsets. Most preferably, but not necessarily, the learning engine, using the training data, computes both the optimized bid floor and the optimized shading factor for each of a plurality of preselected advertising request subsets.

The preselected advertising request subset can be grouped according to any desired variable. For example, the variable comprises one or more of an advertising request source, an advertising request identifier that identifies a specific advertising request, an application identifier of the application that originated the advertising request, an advertising request country where the advertising request originated, a DSP name, a DSP auction type, an SSP auction type, an SSP bid floor, an advertising request timestamp, an advertising request format, a day of the week, a month of the year, a browser type, the optimized bid floor, the hybrid, optimized, shading factor, a clearing price of a winning bid from the DSPs, an outcome of the hybrid, optimized SSP auction, and another variable. For example, the advertising request source comprises one or more of an application and a website. For example, the advertising request format comprises one or more of a fixed image advertisement format and a video advertisement format. For example, the fixed image advertisement format comprises one or more of a banner advertisement, a partial page advertisement, a full page advertisement, and another fixed image advertisement format.

Most preferably, but not necessarily, the preselected advertising request subset comprises a given advertising request source, a given advertising request country, and a given SSP auction type. The SSP auction type comprises one or more of a first-price auction, a second-price auction, and another auction type.

In step 279, the hybrid, optimized exchange, using the learning engine, for all logged baseline advertising requests, determines a baseline advertising request outcome. The baseline advertising request outcome again comprises one or more of an SSP auction result, and hybrid, optimized profit that the hybrid, optimized exchange realizes in the winning SSP auction. Preferably, the baseline advertising request outcome comprises both the SSP auction result and the hybrid, optimized profit. Block 279 then transfers control to block 280.

In step 280, the hybrid, optimized exchange, using the learning engine, for all logged exploitation advertising requests, determines an exploitation advertising request outcome. The exploitation advertising request outcome again comprises one or more of an SSP auction result, and hybrid, optimized profit that the hybrid, optimized exchange realizes in the winning SSP auction. Preferably, the exploitation advertising request outcome comprises both the SSP auction result and the hybrid, optimized profit. Block 280 transfers control to block 281.

In step 281, the hybrid, optimized exchange, using the learning engine, using all the baseline advertising requests' outcomes and all the exploitation advertising requests' outcomes, compares a sum of the outcomes of the baseline advertising requests with a sum of outcomes of the exploitation advertising requests. The hybrid, optimized exchange thereby compares the outcome of the baseline group, whose advertising requests are not using the optimized bid floor and the optimized shading factor, with the outcome of the exploitation group, whose advertising requests use the optimized bid floor and the optimized shading factor. This step comprises sub-steps of computing the sum of the outcomes of the baseline advertising requests, and computing the sum of the outcomes of the exploitation advertising requests. Block 281 then transfers control to block 282.

In step 282, the hybrid, optimized exchange, using the learning engine, for all logged exploration advertising requests, determines an exploration advertising request outcome. The exploration advertising request outcome again comprises one or more of an SSP auction result, and hybrid, optimized profit that the hybrid, optimized exchange realizes in the winning SSP auction the hybrid, optimized exchange. Preferably, the exploration advertising request outcome comprises both the SSP auction result and the hybrid, optimized profit. Block 282 then transfers control to block 283.

In step 283, the hybrid, optimized exchange, using the learning engine, for all logged advertising requests, computes a hybrid, optimized exchange profit by computing the SSP auction winning bid minus the DSP winning bid. Block 283 then transfers control to block 284.

In step 284, the hybrid, optimized exchange, using the learning engine, computes a baseline SSP auction profit by computing the SSP auction winning bid minus the DSP winning bid for all advertising requests assigned to the baseline group, divided by a number of baseline advertising requests, and also computes an exploration-exploitation SSP auction profit lift provided by the hybrid, optimized exchange by computing the SSP auction winning bid minus the DSP winning bid for all advertising requests assigned to the exploration group or to the exploitation group, divided by a combined number of exploration advertising requests and exploitation advertising requests. The baseline SSP auction profit represents the profit per baseline advertising request that is available using prior art systems. The exploration-exploitation SSP auction profit represents the increased profit per exploration-exploitation advertising request that is available using the hybrid, optimized exchange. Computing a profit lift by dividing the exploration-exploitation SSP auction profit by the baseline SSP auction profit gives a profit lift expressing the benefit of the invention in percentage terms. The profit lift is discussed below in the discussion of our experimental results and FIGS. 3A-3B. Block 284 then transfers control to block 285.

In step 285, the hybrid, optimized exchange, using the learning engine, for all logged exploration advertising requests, computes a hybrid, optimized exchange profit by computing the SSP auction winning bid minus the DSP winning bid. Block 285 then transfers control to block 286.

In step 286, the hybrid, optimized exchange, using the learning engine, assigns exploration requests into a plurality of buckets comprising non-overlapping, contiguous ranges of the bid floor, the plurality of buckets further comprising non-overlapping, contiguous ranges of the shading factor.

For example, if we assume that all bid floors are between 0 and 100, and we further assume that all shading factors are between 0 and 100, the hybrid, optimized exchange assigns the exploration requests to one of 100 different buckets. Bucket 1 comprises advertising requests with a bid floor between 0 and 10 and also with a shading factor between 0 and 10. Bucket 2 comprises advertising requests with a bid floor between 0 and 10 and also with a shading factor between 10 and 20. The hybrid, optimized exchange will analyze performance of exploration requests grouped into each of these 100 buckets. The hybrid, optimized exchange then determines which of the 100 buckets in this example has optimized values for the bid floor and the shading factor. Block 286 then transfers control to block 287.

In step 287, for at least one bucket, the hybrid, optimized exchange, using the learning engine, computes the hybrid, optimized SSP auction profit by computing the SSP auction winning bid minus the DSP winning bid for all advertising requests assigned to the bucket, divided by a number of advertising requests in the bucket. Preferably, but not necessarily, for each bucket, the learning engine computes the hybrid, optimized SSP auction profit by computing the SSP auction winning bid minus the DSP winning bid for all advertising requests assigned to the bucket, divided by a number of advertising requests in the bucket. Block 287 then transfers control to block 288.

In step 288, the hybrid, optimized exchange, using the learning engine, determines the optimized bid floor as a midpoint of a range of bid floors contained in a best bucket. The hybrid, optimized exchange selects as the best bucket one or more of a bucket with the highest profit per request and a bucket with a highest lower confidence bound of profit per request. Block 288 then transfers control to block 290.

In step 290, the hybrid, optimized exchange, using the learning engine, determines the optimized shading factor as a midpoint of a range of shading factors contained in the best bucket. For example, the step of determining the optimized shading factor as a midpoint of a range of shading factors contained in a best subset comprises selecting as the best subset one or more of a subset with the highest profit per request and a subset with a highest lower confidence bound of profit per request.

For example, the hybrid, optimized exchange determines one or more of the optimized bid floor and the optimized shading factor for a given subset of advertising requests, summing over all the advertising requests comprised in the subset, using the equation:

$$\alpha^*, \beta^* = \mathrm{argmax}_B \Sigma \mathrm{profit}(v, \alpha, \beta)/|B_{\alpha,\beta}| \quad (1)$$

where:
- $\alpha^*, \beta^*$ are the calculated optimized values for bid floor and shading factor, respectively;
- $v$ is the application identifier,
- $\alpha, \beta$ are the values for bid floor and shading factor, respectively, in the training data; and
- $|B_{\alpha,\beta}|$ is the size of the subset comprising $\alpha$ and $\beta$. Block 290 then transfers control to block 291.

In step 291, the hybrid, optimized exchange, using the learning engine, stores both the optimized bid floor and the optimized shading factor. Preferably, but not necessarily, the learning engine stores both the optimized bid floor and the optimized shading factor in the database. Block 291 then loops back to block 210 and the process restarts.

Experiments

FIGS. 3A-3B are a set of two drawings presenting experimental results obtained in simulations run on real-world data using a hybrid, optimized exchange that, using a hybrid, optimized demand-side platform (DSP) auction in an automated advertising auction system, simultaneously optimizes a bid floor provided to a DSP pursuant to a supply-side platform (SSP) auction operated by the SSP and a shading factor used by the hybrid, optimized exchange to place a hybrid, optimized bid on behalf of the DSP in the SSP auction.

FIG. 3A shows how the optimized values of the bid floor and of the shading factor vary over time for a set of advertising requests comprising a given advertising request source, a given advertising request country, and a given SSP auction type. For a system operating in an efficient manner, the hybrid, optimized exchange should converge on an optimized value within approximately two days and after that, variation should be slow. Experimental results bear out these expectations.

FIG. 3B shows the performance of the hybrid, optimized exchange by auction type. These are aggregated results from 20 first-price placements and 20 second-price placements that ran over three weeks and processed more than 37 billion advertising requests. The first-price auction placements achieved a profit lift of 25.77% and the second-price placements achieved a profit lift of 28.37 when compared to the default.

The hybrid, optimized exchange was built and results verified with the use of randomized controlled experiments. More specifically, experiments ran on the hybrid, optimized exchange during 3 weeks in April 2021. The experiment comprised 40 advertising spot placements from a total of 10 SSPs. Twenty placements had first-price (FP) auction placements and twenty placements had second-price (SP) auction placements.

The experiments compare the methods outlined in this patent application against a prior art strategy using fixed values of the bid floor and the shading factor. According to this prior art strategy, for first-price auctions, the bid floor was always multiplied by 1.25 and the shading factor was also 1.25, i.e. the downstream reserve price is increased by 25% and the revenue is decreased by 20%.

For all advertisement placements, the advertising request traffic was divided into three groups: 10% of the traffic was allocated to the baseline group, 10% of the traffic was allocated to the exploration group, and the remaining 80% of the traffic was allocated to the exploitation group. The combination of exploration and exploitation groups are termed a test group, and results achieved by the hybrid, optimized exchange are compared between the test group and the baseline group.

The main evaluation metric used is:

$$\text{ProfitLift}=100\cdot(e\_profit\_1/e\_profit\_0-1),$$

where: e_profit_0 and e_profit_1 are the profit per request for the baseline and test groups, respectively.

For each advertisement placement, the hybrid, optimized exchange used data from the last 48 hours of the exploration group to estimate the optimized bid floor $\alpha^*$ and the optimized shading factor $\beta^*$. As the hybrid, optimized exchange ran and generated new training data, the hybrid, optimized exchanged used this training data to update the optimized exploitation group bid floor and the optimized exploitation group shading factor every hour.

Evaluation

Table 1 presents results for first-price auctions and second-price auctions running over the full three weeks of the experiment and totaling 37 billion advertising requests. The hybrid, optimized exchange provides strong profit lift for both the first-price auctions and the second-price auctions.

TABLE 1

Test Results for First-Price and Second-Price Advertisement Placements by Scenarios (BF = bid floor, SF = shading factor)

| Auction Type | Number of placements | Requests (in billions) | Profit Lift (%) |
|---|---|---|---|
| first-price | 20 | 18.1 | 25.77 |
| second-price | 20 | 19.1 | 28.37 |

The hybrid, optimized exchange is configured simultaneously to optimize a shading factor, the bid floor, and a filter rate.

Embodiments of the invention provide an automated advertising auction system and method for simultaneously optimizing a bid floor, a shading factor, and a filter rate. Embodiments of the invention also relate to providing a method for more accurately and efficiently calculating the filter rate, thereby maximizing efficient use of computer hardware resources in automated real-time auctions.

Embodiments of the invention further comprise a request filter controller. The request filter controller is configured to identify reduced-response DSPs that do not respond to certain types of requests. The request filter controller is further configured, based on the identified reduced-response DSPs, to reduce the requests to the reduced-response DSPs, thereby conserving computer hardware resources may be conserved by reducing the volume of wasted transactions passed to the reduced-response DSPs.

The request filter controller receives from the bid parameter controller one or more of the bid floor and the shading factor for at least one DSP.

The request filter controller, using the bid floor and the shading factor, determines whether to reject the advertising request or, alternatively, whether to pass the advertising request on to one or more DSPs.

By optimizing the filter rate, embodiments of the invention provide a request filter controller for a hybrid, optimized exchange, executable on computer hardware and which is configured to act as a bidding agent for a downstream supply side platform (SSP), and as a selling auctioneer agent for an upstream demand side platform (DSP), the request filter controller being configured to reduce transactions with sub-optimal DSPs so that the computer hardware resources may be conserved by reducing the volume of wasted transactions passed to sub-optimal client DSPs.

The calculation of the filter rate to each DSP is also robust in scenarios where there is little data (for example, when optimizing for uncommon apps). To do this the hybrid, optimized exchange uses a beta function as a noise reduction mechanism.

An advantage of embodiments of the invention is that in contrast to prior art exchanges that charge a fixed bid percentage as profit, a highly standardized and non-optimized approach, by sharp contrast, embodiments of the invention maximize profit that the hybrid, optimized exchange realizes in a winning SSP auction by determining, using machine learning, optimized values of one or more of the bid floor and the shading factor for different advertisements.

An additional advantage of embodiments of the invention is that the hybrid, optimized exchange can adapt as the optimized bid floor and shading factors change over time. For example, when a particular gaming mobile app increases in popularity, then the competition to display advertisements on that mobile app may increase and the prices that DSPs are prepared to bid will rise. Consequently, one or more of the optimized bid floor and the optimized shading factor may change. These changes may be one or more of gradual and sudden. The hybrid, optimized exchange is configured to track these changes in the one or more of the optimized bid floor and the optimized shading factor.

A still other advantage of embodiments of the invention relates to the strategy that one bidding DSP takes being based on expected bids of other DSPs with whom the bidding DSP is competing. That is, the auction participants will be constantly adapting their strategies. The advantage is that the hybrid, optimized exchange, by using its targeted exploration policy, will also adapt its strategy in a data-efficient and automated way that absolutely cannot be provided by a human using pencil and paper, nor was it available in the world prior to the current invention.

Another advantage of embodiments of the invention is that the bid parameter controller explores performance of the exploration group across a range of one or more of different bid floors and different shading factors to do one or more of overcome censoring of bid win data in online auctions and to build a representative training data set.

A further advantage of embodiments of the invention is that the learning estimator is configured to identify-a set of optimized client DSP's and to block transactions with sub-optimal DSP's, thereby conserving computer hardware resources by reducing the volume of wasted transactions passed to sub-optimal client DSP's.

An advantage of embodiments of the invention is providing to the user a joint censored learning of one or more of the bid floor and the shading factor in a dual censored environment by taking into account one or more of the DSPs' distribution of bids on the hybrid, optimized exchange and the winning feedback from downstream SSP. An additional advantage of embodiments of the invention is providing to the user a joint censored learning of both the bid floor and the shading factor in a dual censored environment by taking into account both the DSPs' distribution of bids on the hybrid, optimized exchange and the winning feedback from the downstream SSP. Both the downstream and upstream agents' bid distributions are not observed fully by the hybrid, optimized exchange.

Another advantage of embodiments of the invention is maximizing efficient use of hardware in a joint censoring environment of automatic auctions. A still further advantage of embodiments of the invention is providing DSPs with a curated stream of advertising requests that only contain requests on which the DSPs are likely to bid.

Another advantage of embodiments of the invention is overcoming in an efficient way censoring that auction environments inevitably have.

Another advantage of embodiments of the invention is providing a system and method enabling a different learning method using a DSP for determining dynamic floor pricing in an auction.

A yet other advantage of embodiments of the invention is providing a request filter controller and a learning engine configured to optimize DSP selection and thereby to reduce usage of computer hardware resources.

A still further advantage of embodiments of the invention is providing a solution to the so-called censoring problem, which has been particularly evident in prior art first-price auctions where an intermediary only knows that the highest opponent bid price was higher in case of a loss, and lower in case of a win, but never by how much.

A yet further advantage of embodiments of the invention is providing a method for providing a system and method usable to select appropriate settings usable with intermediaries where the estimator needs to learn the bid floor and shading factor simultaneously while utilizing the dual censoring nature of the bid distributions. Embodiments of the invention accordingly solve a heretofore unresolved problem that becomes even more challenging in the presence of both auctions.

A further advantage of embodiments of the invention is providing a new framework for learning distribution of one or more of upstream bids and downstream bids. A yet additional advantage of embodiments of the invention is providing a new framework for jointly optimizing one or more of bids and reserve prices. Another advantage of embodiments of the invention is providing a new framework for jointly optimizing one or more of bids and reserve prices while taking into account censoring patterns of two types of upstream auctions. A yet other advantage of embodiments of the invention is providing a new framework for jointly optimizing one or more of bids and reserve prices while taking into account censoring patterns of two types of downstream auctions.

Another advantage of embodiments of the invention is hiding a demand below an upstream reserve price following introduction of the upstream reserve price. A yet further advantage of embodiments of the invention is that win prices are not typically disclosed to bidders in the downstream market.

A yet other advantage of embodiments of the invention is that the preferred four hour training interval creates an iterative process that quickly and economically converges on optimum values of one or more of the bid floor and the shading factor. A further advantage of embodiments of the invention is that the preferred four hour training interval allows the hybrid, optimized exchange to track changes in the environment such as increased popularity of an app, decreased popularity of an app, a change in popularity of a type of advertisement placement, and the like.

Any logic or application described herein that comprises software or code can be embodied in any non-transitory computer-readable medium for use by or in connection with an instruction execution system in a computer system or other system. In this sense, the logic may comprise, for example, statements including instructions and declarations that can be fetched from the computer-readable medium and can be executed by the instruction execution system. In the context of the present disclosure, a computer-readable medium can be any medium that can contain, store, or maintain the logic or application described herein for use by or in connection with the instruction execution system. For example, the computer-readable medium may comprise one or more of random access memory (RAM), read-only memory (ROM), hard disk drive, solid-state drive, USB flash drive, memory card, floppy disk, optical disc such as compact disc (CD) or digital versatile disc (DVD), magnetic tape, and other memory components. For example, the RAM may comprise one or more of static random access memory (SRAM), dynamic random access memory (DRAM), magnetic random access memory (MRAM), and other forms of RAM. For example, the ROM may comprise one or more of programmable read-only memory (PROM), erasable programmable read-only memory (EPROM), electrically erasable programmable read-only memory (EEPROM), and other forms of ROM.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A method for, using a hybrid, optimized exchange operably connected to a demand-side platform (DSP), the hybrid, optimized exchange further operably connected to a supply-side platform (SSP), the hybrid, optimized exchange configured to receive an advertising request in an automated advertising auction system, the hybrid, optimized exchange further configured to conduct, using a bid floor, a hybrid, optimized DSP auction of the advertising request among a plurality of DSPS, thereby generating a winning DSP that makes a winning DSP bid after the SSP initiates an SSP auction of the advertising request, the hybrid, optimized exchange optimizing the bid floor provided to the plurality of DSPs in the hybrid, optimized DSP auction and simultaneously optimizing a shading factor used by the hybrid, optimized exchange to place a hybrid, optimized bid on behalf of the winning DSP in the SSP auction, the method comprising: receiving an advertising request for an online advertising auction; randomly assigning the received advertising request to one of three advertising request groups, 1) a baseline group comprising a default set of baseline advertising requests using one or more of a default bid floor and a default shading factor whose performance the hybrid, optimized exchange can compare to a performance of other advertising requests using one or more of the optimized bid floor and the optimized shading factor, 2) an exploration group comprising exploration advertising requests, the exploration group usable by the hybrid, optimized exchange to gather a useful set of training data regarding the advertising requests, and 3) an exploitation group comprising exploitation advertising requests, the exploitation group usable by the hybrid, optimized exchange to exploit one or more of the optimized bid floor and the optimized shading factor; retrieving one or more of the optimized bid floor and the optimized shading factor via a bid parameter query; doing one or more, if the advertising request was assigned to the exploitation group, of setting an exploitation group bid floor equal to the optimized bid floor and setting an exploitation group shading factor equal to the optimized shading factor; storing one or more of the exploitation group advertising request, the exploitation group bid floor and the exploitation group shading factor; doing one or more, if the advertising request was assigned to the baseline group, of setting a baseline group bid floor equal to the configured default bid floor and setting a baseline group shading factor equal to the configured default shading factor; storing one or more of the baseline group advertising request, the baseline group bid floor and the baseline group shading factor; retrieving optimized values for bid parameters for a current advertising request by sending a bid parameter query; doing one or more, if the advertising request was assigned to the exploration group, of applying to the advertising request a range of candidate exploration group bid floors, a bid floor range centered on the optimized bid floor, to explore an outcome of different candidate exploration group bid floors within the bid floor range and thereby to identify the optimized bid floor, and applying to the advertising request a range of candidate exploration group shading factors, the shading factor range centered on the optimized shading factor, to explore an outcome of different candidate exploration group shading factors within the shading factor range and thereby to identify the optimized shading factor; storing the training data; storing one or more of the exploration group advertising request, the exploration group bid floor and the exploration group shading factor; using the bid floor, conducting the hybrid, optimized DSP auction; determining a winning DSP bid by a winning DSP in the hybrid, optimized DSP auction; storing one or more of the winning DSP bid and the winning DSP; using the shading factor, placing an SSP bid for an SSP bid amount on behalf of the winning DSP in the SSP auction; receiving an SSP auction result from the SSP; storing the SSP auction result; determining that a training interval has elapsed, wherein the training interval comprises a period of time after a conclusion of which the hybrid, optimized exchange performs a periodic updated calculation of one or more of the optimal bid floor and the optimal shading factor; retrieving the training data; determining, using the training data, for a preselected advertising request subset, one or more of the optimized bid floor and the optimized shading factor; determining a baseline advertising request outcome; determining an exploitation advertising request outcome; comparing the outcome of the baseline advertising request with the outcome of the exploitation advertising request; determining an exploration advertising request outcome; computing a baseline SSP auction profit by computing a baseline SSP auction winning bid minus a baseline DSP winning bid for all advertising requests assigned to the baseline group, divided by a number of baseline advertising requests, and also computing a hybrid, optimized SSP auction profit provided by the hybrid, optimized exchange by computing an exploration- exploitation SSP auction winning bid minus an exploration-exploitation DSP winning bid for all advertising requests assigned to the exploration group or to the exploitation group, divided by a combined number of exploration advertising requests and exploitation advertising requests; dividing exploration requests into a plurality of buckets comprising non-overlapping, contiguous ranges of the bid floor, the plurality of buckets further comprising overlapping, contiguous ranges of the shading factor; computing hybrid, optimized profit by computing the SSP auction winning bid minus the DSP winning bid for a best bucket; determining the optimized bid floor as a midpoint of a range of bid floors contained in the best bucket; determining the optimized shading factor as a midpoint of a range of shading factors contained in the best bucket; and storing both the optimized bid floor and the optimized shading factor.

2. The method of claim 1, wherein the assigning step further comprises assigning a majority of the advertising requests to the exploitation group.

3. The method of claim 1, wherein the assigning step further comprises assigning approximately 10% of the advertising requests to the baseline group, assigning approximately 10% of the advertising requests to the exploration group, and assigning approximately 80% of the advertising requests to the exploitation group.

4. The method of claim 1, wherein the one or more of the default bid floor and the default shading factor are predetermined by a human operator.

5. The method of claim 1, wherein the step of retrieving the optimized values comprises retrieving both the optimized bid floor and the optimized shading factor.

6. The method of claim 1, wherein the bid parameter query comprises a query for one or more of the optimized bid floor and the optimized shading factor for one or more of a given advertising request source, a given advertising request country, and a given SSP auction type.

7. The method of claim 1, wherein the step of doing one or more of setting a baseline group bid floor for the baseline group equal to the configured default bid floor and setting a baseline group shading factor equal to the configured default shading factor comprises both setting the baseline group bid floor equal to the configured default bid floor and setting the baseline group shading factor equal to the configured default shading factor.

8. The method of claim 1, wherein the step of storing one or more of the baseline group advertising request, the baseline group bid floor and the baseline group shading factor comprises storing the baseline group advertising request, the baseline group bid floor and the baseline group shading factor.

9. The method of claim 1, wherein the step of doing one or more, if the advertising request was assigned to the exploration group, of applying to the advertising request a range of candidate exploration group bid floors and applying to the advertising request a range of candidate exploration group shading factors comprises both determining the exploration group bid floor by exploring around the optimized bid floor comprised within the bid floor range centered on the optimized bid floor, and determining the exploration group shading factor by exploring around the optimized shading factor comprised within the shading factor range centered on the optimized shading factor.

10. The method of claim 1, wherein the step of doing one or more of applying to the advertising request a range of candidate exploration group bid floors and applying to the advertising request a range of candidate exploration group shading factors comprises using a random number generator to select the one or more of the candidate bid floors and the candidate shading factors.

11. The method of claim 1, wherein the step of doing one or more of applying to the advertising request a range of candidate exploration group bid floors and applying to the advertising request a range of candidate exploration group shading factors comprises computing the exploration group bid floor as equal to (a random number between 0.5 and 2.0)*(the exploitation group bid floor).

12. The method of claim 1, wherein the step of doing one or more of applying to the advertising request a range of candidate exploration group bid floors and applying to the advertising request a range of candidate exploration group shading factors comprises computing the exploration group shading factor as equal to (a random number between 0.5 and 2.0)*(the exploitation group shading factor).

13. The method of claim 1, wherein the training data comprises one or more of the outcome of the exploration group advertising request, the exploration group bid floor and the exploration group shading factor.

14. The method of claim 1, wherein the step of storing one or more of the exploration group advertising request, the exploration group bid floor and the exploration group shading factor comprises storing the exploration group advertising request, the exploration group bid floor and the exploration group shading factor.

15. The method of claim 1, wherein the step of storing one or more of the winning DSP bid and the winning DSP comprises storing both the winning DSP bid and the winning DSP.

16. The method of claim 1, wherein the SSP bid amount comprises a quotient of the winning DSP bid divided by the shading factor.

17. The method of claim 1, wherein the SSP auction result comprises one or more of an SSP auction win and an SSP auction loss.

18. The method of claim 17, wherein the SSP auction win comprises an SSP auction winning amount.

19. The method of claim 1, wherein the baseline advertising request outcome comprises one or more of an SSP auction result and hybrid, optimized profit that the hybrid, optimized exchange realizes in the winning SSP auction.

20. The method of claim 19, wherein the baseline advertising request outcome comprises both the SSP auction result and the hybrid, optimized profit.

21. The method of claim 1, wherein the exploitation advertising request outcome comprises one or more of an SSP auction result and hybrid, optimized profit that the hybrid, optimized exchange realizes in the winning SSP auction.

22. The method of claim 21, wherein the exploitation advertising request outcome comprises both the SSP auction result and the hybrid, optimized profit.

23. The method of claim 1, wherein the exploration advertising request outcome comprises one or more of an SSP auction result and hybrid, optimized profit that the hybrid, optimized exchange realizes in the winning SSP auction.

24. The method of claim 23, wherein the exploration advertising request outcome comprises both the SSP auction result and the hybrid, optimized profit.

25. The method of claim 1, wherein the training interval comprises four hours.

26. The method of claim 1, wherein the step of determining one or more of the optimized bid floor and the optimized shading factor comprises determining both the optimized bid floor and the optimized shading factor.

27. The method of claim 26, wherein the step of determining, for a preselected advertising request subset, one or more of the optimized bid floor and the optimized shading factor comprises determining both the optimized bid floor and the optimized shading factor for each of a plurality of preselected advertising request subsets.

28. The method of claim 1, wherein the preselected advertising request subset is grouped according to one or more of an advertising request source, an advertising request identifier that identifies a specific advertising request, an application identifier of an application that originated the advertising request, an advertising request country where the advertising request originated, a DSP name, a DSP auction type, an SSP auction type, an SSP bid floor, an advertising request timestamp, an advertising request format, a day of the week, a month of the year, a browser type, the optimized bid floor, the hybrid, optimized, shading factor, a clearing price of a winning bid from the DSPs, and an outcome of the hybrid, optimized SSP auction.

29. The method of claim 1, wherein the preselected advertising request subset comprises a given advertising request source, a given advertising request country, and a given SSP auction type.

30. The method of claim 1, wherein the step of storing the one or more of the optimized bid floor and the optimized shading factor comprises storing both the determined, optimized bid floor and the determined, optimized shading factor.

31. The method of claim 1, wherein the step of determining the optimized bid floor as a midpoint of a range of bid floors contained in a best subset comprises selecting as the best subset one or more of a subset with the highest profit per request and a subset with a highest lower confidence bound of profit per request.

32. The method of claim 1, wherein the step of determining the optimized bid floor as a midpoint of a range of bid floors comprises a subset of selecting as the best bucket one or more of a bucket with the highest profit per request and a bucket with a highest lower confidence bound of profit per request.

33. The method of claim 1, wherein the step of determining the optimized shading factor as a midpoint of a range of shading factors comprises selecting as a best subset one or more of a subset with the highest profit per request and a subset with a highest lower confidence bound of profit per request.

* * * * *